(12) United States Patent
Hyuga

(10) Patent No.: US 6,836,076 B2
(45) Date of Patent: Dec. 28, 2004

(54) EXPOSURE DEVICE

(75) Inventor: Hiroaki Hyuga, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/616,999

(22) Filed: Jul. 11, 2003

(65) Prior Publication Data

US 2004/0012341 A1 Jan. 22, 2004

(30) Foreign Application Priority Data

| Jul. 18, 2002 | (JP) | 2002-210113 |
| Jul. 18, 2002 | (JP) | 2002-210114 |
| Jul. 18, 2002 | (JP) | 2002-210115 |

(51) Int. Cl.[7] ............................................. G09G 3/10
(52) U.S. Cl. .................... 315/169.3; 430/569; 430/363; 430/383
(58) Field of Search .............. 315/169.1, 169.3, 315/169.4, 291, 362; 430/363, 383, 384, 385, 567, 605

(56) References Cited

U.S. PATENT DOCUMENTS 4,459,512 A * 7/1984 Ohhata ..................... 315/10
5,445,924 A * 8/1995 Kawai ..................... 430/363
2004/0005519 A1 * 1/2004 Ohshima ................... 430/383

FOREIGN PATENT DOCUMENTS

| JP | 2000-103114 A | 4/2000 |
| JP | 2001-356422 A | 12/2001 |

* cited by examiner

Primary Examiner—James Vannucci
Assistant Examiner—Jimmy Wu
(74) Attorney, Agent, or Firm—Sughrue Mion, PLLC

(57) ABSTRACT

A disclosed exposure device performs controlling exposing dose by gradations of $\{n \times (m-1)+1\}$ stages representing shadow to highlight for each color when exposing the maximum n times under a condition that every light-emitting element is exposure-gradation controlled independently at m-stages. When a silver halide photosensitive material is used as a photosensitive material, light sensitivity is high in the order of red, green and blue. The number of aligned rows of red light-emitting elements is greater than those of aligned rows of other colors for reducing the light-emitting intensity on a time-average basis for every red light-emitting element. The area of red light-emitting elements and the area of green and blue light-emitting elements are simultaneously and independently passive-matrix driven by corresponding driving circuits. Of each light-emitting element, the driving duty improves and the peak light-emitting intensity reduces.

31 Claims, 13 Drawing Sheets

FIG.3

ASSIGNING PROCESS OF EXPOSURE GRADATIONS TO RESPECTIVE ELEMENTS

| | 0 | 1 | 2 | 3 | 4 | 5 | 6 | 7 | ... | 241 | ... | 765 |
|---|---|---|---|---|---|---|---|---|---|---|---|---|
| R ELEMENT 1 | 0 | 1 | 1 | 1 | 2 | 2 | 2 | 3 | ... | 81 | ... | 255 |
| R ELEMENT 2 | 0 | 0 | 1 | 1 | 1 | 2 | 2 | 2 | ... | 80 | ... | 255 |
| R ELEMENT 3 | 0 | 0 | 0 | 1 | 1 | 1 | 2 | 2 | ... | 80 | ... | 255 |

FIG.4

ASSIGNING PROCESS OF EXPOSURE GRADATIONS TO RESPECTIVE ELEMENTS

| | 0 | 1 | 2 | 3 | 4 | 5 | 6 | 7 | ... | 255 | 256 | 257 | ... | 510 | 511 | ... | 765 |
|---|---|---|---|---|---|---|---|---|---|---|---|---|---|---|---|---|---|
| R ELEMENT 1 | 0 | 1 | 2 | 3 | 4 | 5 | 6 | 7 | ... | 255 | 255 | 255 | ... | 255 | 255 | ... | 255 |
| R ELEMENT 2 | 0 | 0 | 0 | 0 | 0 | 0 | 0 | 0 | ... | 0 | 1 | 2 | ... | 255 | 255 | ... | 255 |
| R ELEMENT 3 | 0 | 0 | 0 | 0 | 0 | 0 | 0 | 0 | ... | 0 | 0 | 0 | ... | 0 | 1 | ... | 255 |

FIG.6

|   | ni | mi | ni × (mi−1)+1 |
|---|----|----|----|
| R | 4 | 256 | 1021 |
| G | 3 | 341 | 1021 |
| B | 2 | 511 | 1021 |

FIG.7

|   | ni | mi | ni × (mi−1)+1 |
|---|----|----|----|
| R | 4 | 256 | 1021 |
| G | 3 | 512 | 1534 |
| B | 2 | 512 | 1023 |

FIG.12

|   | ni | mi | ni×(mi−1)+1 |
|---|----|----|-------------|
| R | 32 | 128 | 4065 |
| G | 16 | 256 | 4081 |
| B | 16 | 256 | 4081 |

EXPOSURE DEVICE

CROSS-REFERENCE TO RELATED APPLICATION

This application claims priority-under 35 USC 119 from Japanese patent applications, No. 2002-210113, No. 2002-210114 and No. 2002-210115, the disclosure of which is incorporated by reference herein.

BACKGROUND OF THE INVENTION

1. Field of the Invention

The present invention relates to an exposure device. Particularly, the invention relates to an exposure device including a plurality of kinds of light-emitting elements with different light-emitting spectra, which are placed at intersections of matrix electrodes, for performing superior in gradation reproducibility.

2. Description of the Related Art

An organic EL (Electro-Luminescent) element, which employs a fluorescent organic substance for a light-emitting layer thereof, can be easily manufactured compared with other types of light-emitting elements. The organic EL element enables to manufacture a thin, light-weight light-emitting element. Owing to such features, the organic EL elements have been researched and developed to use them as elements for thin display. In recent years, high-performance organic EL elements comparable to light-emitting diodes (LEDs) have been developed in terms of light-emitting luminance, efficiency and durability. Consequently, the application of such organic EL elements has been studied to an exposure device for exposing photosensitive materials such as silver halide photosensitive material.

For example, Japanese Patent Application Laid-Open (JP-A) No. 2000-103114 has disclosed an exposure device using organic EL elements. As shown in FIG. 8, element rows, each formed by arranging a plurality of organic EL elements 80 for emitting lights with respective colors of red (R), green (G) and blue (B) in a main scanning direction for the respective colors, are grouped into sets of three RGB colors. Such sets (2 sets in FIG. 8) are arranged in the sub-scanning direction. In FIG. 8, each alphabet (R/G/B) that represents its corresponding color is put to the ends of respective symbol in order to discriminate between the organic EL elements 80 of the respective RGB colors.

In this exposure device, each of the light rays of RGB colors is applied to the same position of a photosensitive material once every sub-scanning process so that a full color latent image is formed on the photosensitive material. Moreover, an unillustrated control circuit controls the light-emission intensity and light-emission time of each organic EL element. A predetermined exposure gradation is achieved for each of the RGB colors. For example, assuming that exposure gradations of m-steps are available for each color, the number of possible color developments of this exposure device is represented by $m^3$. Thus, in order to obtain multiple color developments, the number m of exposure gradations is required to increase. For example, in order to increase the number of exposure gradations in exposure control in the pulse-width modulation system and pulse number modulation system, the minimum pulse time width needs to be smaller.

It is difficult to control the driving current of the light-emitting element such as organic EL elements with high precision by using a fine pulse time width, from the viewpoint of control precision of the control circuit. Moreover, when the organic EL element is used as a light-emitting element, even if the pulse time width of the driving current is controlled with high precision, the response speed of the organic EL element does not properly follow the pulse. Thus, it is difficult to increase the number of exposure gradations. Furthermore, even with the exposure control in the intensity modulation system, it is difficult to control the driving current in fine steps with high precision. In other words, conventionally, when the respective light-emitting elements constituting the exposure device are gradation-modulated in multiple stages so as to carry out exposing processes, the number of exposure gradations is limited.

The control circuit controls the light-emitting intensity and light-emitting time of each organic EL element. A predetermined exposure gradation is achieved for each of the RGB colors. For example, assuming that exposure gradations of m-steps are available for each color, the number of possible color developments of this exposure device is represented by $m^3$. Thus, in order to obtain multiple color developments, the number m of exposure gradations needs to increase. For example, in order to increase the number of exposure gradations in exposure control in the pulse-width modulation system and pulse number modulation system, the minimum pulse time width needs to be smaller.

Each photosensitive material has a different sensitivity to each of light rays of the respective colors. Thus, with respect to a color having a low sensitivity, an exposing process is required to be with a higher light-emitting intensity. In this case, the service life of the light-emitting element having a color that requires a high light-emitting intensity tends to become particularly shorter compared with the light-emitting element with the other colors. Thus, the service life of the exposure device is limited by the light-emitting element having the shortest service life. When the photosensitive material is a silver halide photosensitive material, the sensitivity to red light is lower than the sensitivity to green light or blue light in the order of not less than one digit. Thus, the light-emitting intensity of the red color light-emitting element needs to increase. Consequently, the shorter the service life of the light-emitting element of red color becomes, the shorter the shorter service life of the exposure head will become.

Generally, the greater the number of element rows becomes, the more the light-emitting intensity can reduce on a time average basis and the more reliable the exposure device will become. In contrast, the exposure device will become larger, resulting in degradation in the production yield and an increase in costs. This means that the total number of the element rows has an appropriate upper limit. Thus, the reliability of the entire exposure device is demanded to improve while maintaining the total number of the element rows in a fixed value.

For example, assuming that exposure gradations of m-steps are available for each color, the number of possible color developments of this exposure device is represented by $m^3$. In order to obtain multiple color developments, the number m of exposure gradations needs to increase. For example, in order to increase the number of exposure gradations in exposure control in the pulse-width modulation system and pulse number modulation system, the minimum pulse time width needs to be smaller.

Each photosensitive material has a different sensitivity to each of light rays of the respective colors. Thus, with respect to a color having a low sensitivity, an exposing process needs to be with a higher light-emitting intensity. Here, the service life of the light-emitting element having a color that requires a high light-emitting intensity tends to become particularly shorter compared with the light-emitting element with the other colors. Thus, the service life of the exposure device is limited by the light-emitting element having the shortest service life. When the photosensitive material is a silver halide photosensitive material, the sensitivity to red light is lower than the sensitivity to green or blue light in the order of not less than one digit. Thus, the light-emitting intensity of the red color light-emitting element needs to increase. Consequently, the service life of the light-emitting element of red color becomes shorter and the service life of the exposure head becomes shorter.

SUMMARY OF THE INVENTION

The present invention has been devised to meet the above-mentioned demands. An object of the invention is to provide an exposure device capable of increasing significantly the number of exposure gradations exceeding the conventional limit.

Another object of the invention is to reduce the light-emitting intensity of the light-emitting element that has the lowest sensitivity in the photosensitive material on a time average basis and consequently to provide an exposure device with superior reliability.

Still another object is to provide an exposure device with superior reliability.

According to a first aspect of the present invention, an exposure device has a light-emitting element array and a control device. The light-emitting element array has a plurality of element rows, each of which has a plurality of light-emitting elements with substantially the same light-emitting spectrum. At the elements, the exposure gradation can be controlled independently at m ($m \geq 3$) stages. The light-emitting elements are aligned in a main scanning direction that intersects the sub-scanning direction. Such rows are aligned in the sub-scanning direction and at least n ($n \geq 2$) number of light-emitting elements are aligned in the sub-scanning direction. The control device assigns exposure gradations to each of the n number of light-emitting elements aligned in the sub-scanning direction according to the respective gradations obtained when a range from shadow to highlight is represented by $\{n \times (m-1)+1\}$ stages. Based upon the exposure gradations thus assigned, the control device controls each of the above-mentioned n-number of light-emitting elements so that the same position of the photosensitive material is subjected to multiple exposing processes of n times at maximum.

Regarding the light-emitting elements, independent control of the exposure gradation at m ($m \geq 3$) stages is available. This exposure device employs the light-emitting element array as follows. The light-emitting element array has a plurality of element rows. Each of the element rows has a plurality of light-emitting elements, each of which has substantially the same light-emitting spectrum. The elements are aligned in the main scanning direction that intersects the sub-scanning direction. Such element rows are aligned in the sub-scanning direction in order to align at least n ($n \geq 2$) number of light-emitting elements in the sub-scanning direction. In this exposure device, exposure gradations can be assigned according to the respective gradations obtained when each of the n number of light-emitting elements aligned in the above-mentioned sub-scanning direction is represented by $\{n \times (m-1)+1\}$ stages with respect to shadow to highlight. Then, based upon the assigned exposure gradations, the control device controls each of the above-mentioned light-emitting elements so that the same position of the photosensitive material is subjected to multiple exposing processes of n times at maximum. In this way, the exposing dose control of $\{n \times (m-1)+1\}$ gradations can be performed. With this arrangement, the exposure gradations can increase significantly exceeding the conventional limit.

In order to achieve one of the above-mentioned objectives, another exposure device of the invention has a light-emitting element array having p ($p \geq 2$) kinds of light-emitting elements with different light-emission spectra. This exposure device also has a control device. The array has a plurality of element rows, each of which has a plurality of light-emitting elements. In the light-emitting elements, the exposure gradation can be controlled in $m_i$ ($m_i \geq 3$, i is an integer of 1 to p) stages independently for each of the kinds. The light-emitting elements are aligned in the main scanning direction that intersects the sub-scanning direction. Such rows are aligned in the sub-scanning direction and at least $n_i$ ($n_i \geq 2$, i is an integer of 1 to p) number of light-emitting elements are aligned in the sub-scanning direction for each of the kinds. The control device assigns exposure gradations to each of the $n_i$ number of light-emitting elements aligned in the sub-scanning direction according to the respective gradations obtained when a range from shadow to highlight is represented by $\{n_i \times (m_i-1)+1\}$ stages. Based upon the exposure gradations thus assigned, the control device controls each of the above-mentioned ni-number of light-emitting elements so that the same position of the photosensitive material is subjected to multiple exposing processes of $n_i$ times at maximum.

In this arrangement, the light-emitting array has p ($p \geq 2$) kinds of light-emitting elements having different light-emission spectra and a structure in which a plurality of element rows. Each of the element rows has a plurality of light-emitting elements which the exposure gradation can be controlled in $m_i$ ($m_i \geq 3$, i is an integer of 1 to p) stages independently for each of the kinds. The light-emitting elements are aligned in the main scanning direction that intersects the sub-scanning direction. Such element rows are also aligned in the sub-scanning direction so that at least ni ($n_i \geq 2$, i is an integer of 1 to p) number of light-emitting elements are aligned in the sub-scanning direction for each of the kinds. Exposure gradations can be assigned according to the respective gradations obtained when each of the ni number of light-emitting elements aligned in the above-mentioned sub-scanning direction is represented by $\{n_i \times (m_i-1)+1\}$ stages with respect to shadow to highlight.

Based upon the exposure gradations thus assigned, the control device controls the above-mentioned light-emitting elements and the same sub-scanning position of the photosensitive material is subjected to multiple exposing processes of ni times at maximum. Thus, the exposing dose control of $\{n_i \times (m_i-1)+1\}$ gradations can be performed. As a whole, the exposing dose control of $\{n_1 \times (m_1-1)+1\} \cdot \{n_2 \times (m_2-1)+1\} \cdots \{n_p \times (m_p-1)+1\}$ gradations can be achieved. The number of exposure gradations increases significantly to exceed the conventional limit.

In an exposure device with the above-mentioned p kinds of light-emitting elements, the number of the first set of light-emitting elements may be greater than the number of other sets of the light-emitting elements. The first set of the elements emits light of the light-emitting spectrum having the lowest sensitivity to the photosensitive material among the p kinds of light-emitting elements that are aligned in the sub-scanning direction. The light-emitting intensity (time average) of the light-emitting elements having the lowest sensitivity to the photosensitive material will reduce and the reliability of the exposure device will thereby improve.

The light-emitting elements of p kinds may be prepared as three kinds of light-emitting element shaving light-emitting spectra that are capable of forming a full color image in association with the photosensitive materials. For example, the three kinds of light-emitting elements may be prepared as red light-emitting elements for emitting red light, green light-emitting elements for emitting green light and blue light-emitting elements for emitting blue light. With this arrangement, a full-color image (latent image) can be formed. Moreover, the number of exposure gradations for each kind may be arranged to satisfy the following equation.

$$\{n_1 \times (m_1-1)+1\} = \{n_2 \times (m_2-1)+1\} = \ldots = \{n_p \times (m_p-1)+1\}$$

By setting the numbers of exposure gradations to the same value for the respective colors, accurate gray gradations can be achieved from black to white according to the respective exposure gradations.

There is a case that the light-emitting array is constituted by matrix electrodes in which a plurality of anodes and a plurality of cathodes are arranged in a lattice shape and light-emitting elements that are placed at the intersections of these matrix electrodes. The above-mentioned exposure device may be arranged as follows. Matrix electrodes of the light-emitting array are divided into a plurality of areas in the cathode array direction or the anode array direction. A drive device, which carries out a driving process independently to apply a voltage between the above-mentioned cathode and anode so that the light-emitting element placed at the intersection of the matrix electrodes of the corresponding area is lighted on, may be further provided for each of the divided areas.

There is a case that the entire light-emitting element group is driven by dividing the matrix electrodes into a plurality of areas, and applying a voltage between the cathode and anode for each of the areas in order to drive and activate the light-emitting element placed on each intersection of the matrix electrodes in the area independently. Compared with this case, the present invention can reduce the number of light-emitting elements to be assigned to each cathode or each anode, thereby improving the driving duty of each light-emitting element and reducing the peak light-emitting intensity. Consequently, the reliability of the exposure device improves. Here, the driving duty refers to a ratio t/T of the pulse width t with respect to the pulse repeating frequency T when the light-emitting elements are pulse-driven. Because the exposing efficiency improves by improving the driving duty, the peak light-emitting intensity of each light-emitting element will reduce.

When the exposure device is provided with a plurality of kinds of light-emitting elements having different light-emitting spectra, the area where light-emitting elements having the lowest sensitivity of the photosensitive material are aligned may be driven independent of other areas. With this independent driving, the peak light-emitting intensity of the light-emitting elements with the lowest sensitivity lowers, and the reliability of the exposure device will further improve.

In the above-mentioned exposure device, organic EL elements, which are easily formed into an array, are often used as light-emitting elements. A number of organic EL elements can be formed on a single substrate by using a coating method and an ink-jet method in addition to a vacuum vapor deposition. When the organic EL element is used as the light-emitting element in the exposure device, the productivity of the device will improve, and time-consuming tasks for adjusting the layout positions of the respective light-emitting elements will be eliminated. Thus, the layout positions are maintained with high precision. With respect to the substrate on which a light-emitting array is formed, a TFT (thin-film transistors) substrate is often used. Each light-emitting element will be able to perform an exposure gradation control at multiple stages by modulating at least one of the light-emitting intensity and exposing time so as to control the exposure gradations.

Here, the exposing dose control of $\{n \times (m-1)+1\}$ gradations can be performed with an exposure device as follows. The exposure device has a light-emitting element array. The array has a plurality of element rows, each of which has a plurality of light-emitting elements. The elements with substantially the same light-emitting spectrum can be controlled independently in the exposure gradation in m (m≧3) stages, and are aligned in the main scanning direction. The main scanning direction intersects the sub-scanning direction, and such elements are aligned in the sub-scanning direction in order to align at least n (n≧2) number of light-emitting elements in the sub-scanning direction. Exposure gradations are assigned according to the respective gradations obtained when each of the n number of light-emitting elements aligned in the above-mentioned sub-scanning direction is represented by $\{n \times (m-1)+1\}$ stages with respect to shadow to highlight. Based upon the exposure gradations thus assigned, the same position of the photosensitive material is subjected to multiple exposing processes of n times at maximum. With this exposing method, the exposure gradations can increase significantly exceeding the conventional limit.

Moreover, the exposing dose control of $\{n_i \times (m_i-1)+1\}$ gradations can be performed with another exposure device. In other words, as a whole, the exposing dose control of $\{n_1 \times (m_1-1)+1\} \cdot \{n_2 \times (m_2-1)+1\} \ldots \{n_p \times (m_p-1)+1\}$ gradations can be performed. The exposure device has a light-emitting element array. The array has a plurality of element rows. Each element row has p (p≧2) kinds of light-emitting elements with different light-emission spectra. Each of the elements can be controlled independently in the exposure gradation in $m_i$ ($m_i$≧3, i is an integer of 1 to p) stages for each of the kinds. The elements are aligned in the main scanning direction that intersects the sub-scanning direction. The element rows are aligned in the sub-scanning direction, and at least $n_i$ ($n_i$≧2, i is an integer of 1 to p) number of light-emitting elements are aligned in the sub-scanning direction for each of the kinds. Exposure gradations are assigned according to the respective gradations obtained when each of the $n_i$ number of light-emitting elements aligned in the above-mentioned sub-scanning direction is represented by $\{n_i \times (m_i-1)+1\}$ stages with respect to shadow to highlight. Based upon the exposure gradations thus assigned, each of the above-mentioned $n_i$-number of light-emitting elements is controlled and a single position of the photosensitive material is subjected to multiple exposing processes of $n_i$ times at maximum. In this case, the number of exposure gradations will increase significantly exceeding the conventional limit.

Here, the exposure device of the invention is applicable to an exposure device of silver halide color photosensitive material. By using the silver halide color photosensitive material that is superior in gradation expressing property and gradation reproducibility, the exposure device of the present invention faithfully reproduces all the number of high exposure gradations.

According to a second aspect of the invention, there is provided an exposure device comprising a light-emitting element array. The array has a plurality of kinds of light-emitting elements that have different light-emitting spectra, with at least one light-emitting element with respect to each of the kinds being aligned in the sub-scanning direction. The plurality of kinds of light-emitting elements are arranged such that the number of a set of light-emitting elements is greater than the number of elements for each kind of the light-emitting elements in the sub-scanning direction. The set of light-emitting elements is to emit the light of the light-emitting spectrum having the lowest sensitivity with respect to the photosensitive material in the plurality of kinds of light-emitting elements. By using the plurality of light-emitting elements arranged in the sub-scanning direction, a single position of the photosensitive material is subjected to multiple exposing processes.

According to the exposure device of the second aspect, a light-emitting element array in which light-emitting elements of a plurality of kinds have different light-emitting spectra is provided. In this light-emitting element array, at least one light-emitting element is aligned with respect to each of the kinds in the sub-scanning direction so that by using the light-emitting elements arranged in the sub-scanning direction, the same position of the photosensitive material is subjected to multiple exposing processes. In this light-emitting element array, the plurality of kinds of light-emitting elements are arranged such that the number of a particular set of light-emitting elements is greater than the number of elements for each kind of the light-emitting element of the other kinds. The set of light-emitting elements has the lowest sensitivity (that is, emitting the light of the light-emitting spectrum with the lowest sensitivity) with respect to the photosensitive material of the above-mentioned plurality of kinds of light-emitting elements. Thus, the light-emitting intensity (time average) of the light-emitting element having the lowest sensitivity with respect to the photosensitive material reduces, and consequently the service life of the light-emitting elements prolongs. Consequently, the reliability of the exposure device improves.

The plurality of kinds of light-emitting elements may be prepared as light-emitting elements of three kinds that are provided with light-emitting spectra capable of forming a full-color image in association with the photosensitive material. For example, three kinds of light-emitting elements, that is, red light-emitting elements for emitting red light, green light-emitting elements for emitting green light and blue light-emitting elements for emitting blue light, may be prepared. Thus, a full-color image (latent image) can be formed. For example, when the above-mentioned photosensitive material is a silver halide photosensitive material, the number of elements of the red light-emitting elements is set to be greater than the number of blue light-emitting elements, and also greater than the number of green light-emitting elements.

For example, the light-emitting element array has p ($p \geq 2$) kinds of light-emitting elements with different light-emission spectra. The array has a plurality of element rows, each of which has a plurality of light-emitting elements that the exposure gradation can be controlled at $m_i$ ($m_i \geq 3$, i is an integer of 1 to p) stages in an independent manner respectively for each of the kinds. The elements are aligned in the main scanning direction that intersects the sub-scanning direction. Such rows are aligned in the sub-scanning direction and at least $n_i$ ($n_i \geq 2$, i is an integer of 1 to p) number of light-emitting elements are aligned in the sub-scanning direction for each of the kinds. In this light-emitting element array, the number of element rows in which the light-emitting elements having the lowest sensitivity to the photosensitive material among the above-mentioned p-kinds of light-emitting elements may be greater than the number of other element rows. Each of other element rows is aligned according to each of the kinds of the light-emitting elements.

In this multi-gradation exposure device, exposure gradations can be assigned to the $n_i$-number of respective light-emitting elements that are aligned in the sub-scanning direction according to the respective gradations obtained when gradations from shadow to highlight are represented by $\{n_i \times (m_i-1)+1\}$ stages.

In the above-mentioned light-emitting element array, the number of rows of light-emitting elements that emit light having the lowest sensitivity to the photosensitive material in the above-mentioned p kinds of light-emitting elements is made greater than the number of rows of other kinds of light-emitting elements. Thus, the light-emitting intensity (time average) of the light-emitting elements having the lowest sensitivity to the photosensitive material can reduce. Thereby the service life of the light-emitting elements prolongs. Consequently, the reliability of the exposure device improves.

The above-mentioned multi-gradation exposure device often has a control device as well. Based upon the assigned exposure gradations, the control device controls each of the above-mentioned light-emitting elements so that the same position of the photosensitive material is subjected to multiple exposing processes of $n_i$ times at maximum. Thus, the exposing dose control of $\{n_i \times (m_i-1)+1\}$ gradations can be performed. As a whole, the exposing dose control of $\{n_1 \times (m_1-1)+1\} \cdot \{n_2 \times (m_2-1)+1\} \ldots \{n_p \times (m_p-1)+1\}$ gradations can be performed. With this arrangement, the number of exposure gradations significantly exceeding the conventional limit can be achieved.

The number of exposure gradations for each kind is often arranged to satisfy the following equation. By setting the numbers of exposure gradations of the respective colors to the same value for the respective colors, the gradations from black to white can be expressed accurately according to the respective exposure gradations.

$$\{n_1 \times (m_1-1)+1\} = \{n_2 \times (m_2-1)+1\} = \ldots = \{n_p \times (m_p-1)+1\}$$

There is a case when the light-emitting array is constituted by matrix electrodes in which a plurality of anodes and a plurality of cathodes are arranged in a lattice shape with light-emitting elements being placed at the intersections of these matrix electrodes. The above-mentioned exposure device is arranged such that matrix electrodes of the light-emitting array are divided into a plurality of areas in the cathode array direction or the anode array direction. A driving device may be further provided, which carries out a driving process independently to apply a voltage between the above-mentioned cathode and anode such that the light-emitting element placed at the intersection of the matrix electrodes of the corresponding area is activated.

In comparison with a case in which the entire light-emitting element group is driven, the number of light-emitting elements to be assigned to each cathode or each anode decreases in this exposure device. Accordingly, the driving duty of each light-emitting element improves and the peak light-emitting intensity decreases. This is due to dividing the matrix electrodes into a plurality of areas and applying a voltage between the above-mentioned cathode and anode for each of the areas in order to drive independent and activate the light-emitting element placed at each intersection of the matrix electrodes in the area. Consequently, the reliability of the exposure device improves.

When the exposure device has a plurality of kinds of light-emitting elements having different light-emitting spectra, the area in which light-emitting elements with the lowest sensitivity of the photosensitive material may be driven independently of the other areas among the plurality of kinds of the light-emitting elements. With this independent driving, the peak light-emitting intensity of the light-emitting elements with the lowest sensitivity lowers, the reliability of the exposure device improves.

In the above-mentioned exposure device, organic EL elements, which are easily formed into an array, are often used as light-emitting elements. A number of organic EL elements can be formed on a single substrate by using a coating method and an ink-jet method in addition to a vacuum vapor deposition. When the organic EL element is used as the light-emitting element in the above-mentioned exposure device, the productivity of the exposure device improves. Further, time-consuming tasks can be eliminated for adjusting the layout positions of the respective light-emitting elements. Thus, the layout positions are maintained with high precision. With respect to the substrate on which a light-emitting array is formed, a TFT (thin-film transistors) substrate is often used. Moreover, each light-emitting element is allowed to perform an exposure gradation control in multiple stages by modulating at least one of the light-emitting intensity and exposing time so as to control the exposure gradations.

Here, the exposure device of the invention is applicable to an exposure device of silver halide color photosensitive material. By using the silver halide color photosensitive material that is superior in gradation expressing property and gradation reproducibility, the exposure device of the present invention can achieve faithful reproducing a great number of exposure gradations.

In order to achieve still another object, according to a third aspect of the invention, there is provided an exposure device which exposes a photosensitive material comprising a light-emitting element array and a control device as follows. The light-emitting element array has matrix electrodes that include a plurality of cathodes and a plurality of anodes arranged in a lattice shape. The matrix electrodes are divided into a plurality of areas in the cathode aligning direction or the anode aligning direction and light-emitting elements that are provided at intersections of the matrix electrodes. The driving device applies a voltage between the cathode and anode with respect to each of the divided areas, and independently drives the light-emitting elements that are provided at intersections of the matrix electrodes in the corresponding area so as to be lighted on.

There is a case where the light-emitting array is constituted by matrix electrodes in which a plurality of anodes and a plurality of cathodes are arranged in a lattice shape with light-emitting elements being placed at the intersections of these matrix electrodes. In this case, the matrix electrodes of the light-emitting array are divided into a plurality of areas in the cathode array direction or the anode array direction. The driving device carries out a driving process independently to apply a voltage between the above-mentioned cathode and anode in order to light the light-emitting element placed at the intersection of the matrix electrodes of the corresponding area.

In comparison with a case in which the entire light-emitting element group is driven, the number of light-emitting elements to be assigned to each cathode or each anode reduces. Thereby the driving duty of each light-emitting element improves and the peak light-emitting intensity decreases. This is due to dividing the matrix electrodes into a plurality of areas and applying a voltage between the above-mentioned cathode and anode for each of the areas. These driving and applying a voltage are for driving independently to activate the light-emitting element placed on each intersection of the matrix electrodes in the area (for example, passive-matrix driving). Consequently, the reliability of the exposure device improves.

Here, the driving duty refers to a ratio t/T of the pulse width t with respect to the pulse repeating frequency T when the light-emitting elements are pulse-driven. Because the exposing efficiency improves by improving the driving duty, the peak light-emitting intensity of each light-emitting element reduces.

When the exposure device is provided with a plurality of kinds of light-emitting elements having different light-emitting spectra, the area in which light-emitting elements having the lowest sensitivity to the photosensitive material (that is, emitting light having such light-emitting spectra) may be driven independently of other areas. In this case, the peak light-emitting intensity of the light-emitting elements having the lowest sensitivity lowers and the reliability of the exposure device improves.

In an exposure device having a plurality of kinds of light-emitting elements, the number of rows of light-emitting elements that emit light having the lowest sensitivity to the photosensitive material in the plurality of kinds of light-emitting elements is made greater than any number of rows of other kinds of light-emitting elements. Thus, the light-emitting intensity (time average) reduces of the light-emitting elements having the lowest sensitivity to the photosensitive material. Thereby the reliability of the exposure device improves.

Moreover, the light-emitting elements of a plurality of kinds may be prepared as three kinds of light-emitting elements having light-emitting spectra that are capable of forming a full color image in association with the photosensitive materials. For example, the three kinds of light-emitting elements may be prepared as red light-emitting elements for emitting red light, green light-emitting elements for emitting green light and blue light-emitting elements for emitting blue light. Thus, a full-color image (latent image) can be formed.

In the above-mentioned exposure device, organic EL elements, which are easily formed into an array, are often used as light-emitting elements. A number of organic EL elements can be formed on a single substrate by using a coating method and an ink-jet method in addition to a vacuum vapor deposition. When the organic EL element is used as the light-emitting element in the above-mentioned exposure device, the productivity of the exposure device improves, and time-consuming tasks for adjusting the layout positions of the respective light-emitting elements can be eliminated. Thus, the layout positions are maintained with high precision. Moreover, each light-emitting element is allowed to perform an exposure gradation control in multiple stages, that is, $m_i$ (i=1 to p) stages by modulating at least one of the light-emitting intensity and exposing time so as to control the exposure gradations.

Here, the exposure device of the present invention may often be used as an exposure device for a silver halide color photosensitive material. By using the silver halide color photosensitive material, the exposure device of the present invention can faithfully reproduce an increased number of exposure gradations.

When a silver halide photosensitive material is used as the photosensitive material, a full-color image by using three kinds of light-emitting elements of red, green and blue can be formed. Red light-emitting elements having the lowest sensitivity to the photosensitive material may be formed at intersections in a predetermined divided area of the matrix electrodes in the light-emitting element array while green and blue light-emitting elements are formed at intersections in other divided areas.

BRIEF DESCRIPTION OF THE DRAWINGS

FIG. 3 is a drawing that shows one example of an assigning process of exposure gradations to each light-emitting element.

FIG. 4 is a drawing that shows another example of an assigning process of exposure gradations to each light-emitting element;

FIG. 6 is a drawing that shows one example of an assigning process of exposure gradations for each of the colors.

FIG. 7 is a drawing that shows another example of an assigning process of exposure gradations for each of the colors.

FIG. 12 is a drawing that shows one example of an assigning process of exposure gradations to each light-emitting element.

DETAILED DESCRIPTION OF THE INVENTION

Referring to drawings, the following description will discuss embodiments of the present invention in detail.

First Embodiment

Structure of Exposure Device

Figure 1:
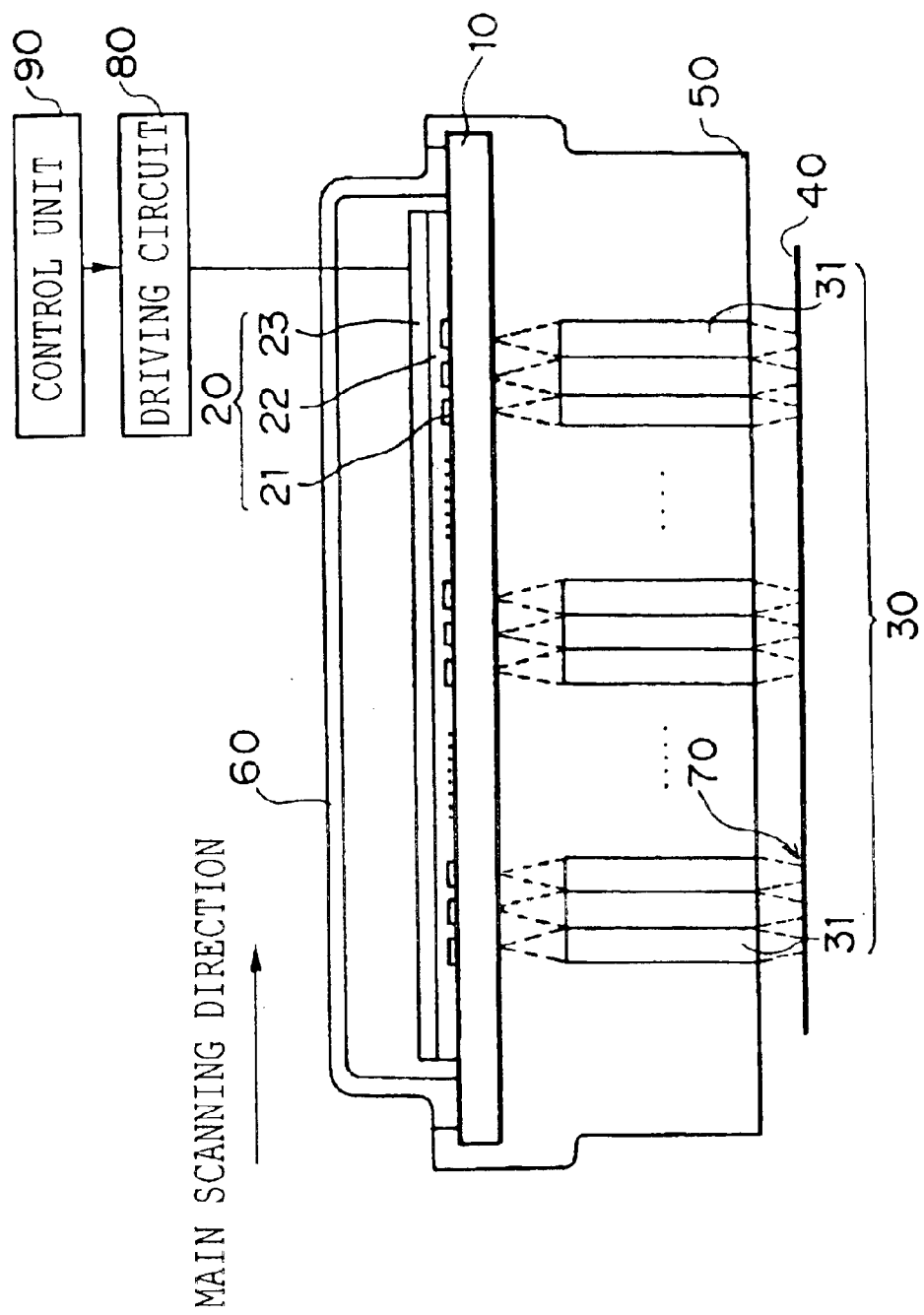
FIG. 1 is a cross-sectional view showing the structure of an exposure device according to a first embodiment.

As shown in FIG. 1, an exposure device according to an embodiment of the present invention has a transparent substrate 10, an organic EL array 20, a SELFOC lens array 30, and a supporting member 50. The organic EL array 20 has a plurality of light-emitting units (hereinafter, each light-emitting unit is referred to as "light-emitting element") each of which is formed on the transparent substrate 10 and emits light of any of red, green or blue (R, G or B). The SELFOC lens array (hereinafter, referred to as "SLA") 30 converges light rays emitted from the respective light-emitting elements of the organic EL array 20, and directs the resulting light to the photosensitive material 40. The supporting member 50 supports the transparent substrate 10 and the SLA 30.

The organic EL array 20 is formed by successively laminating a transparent electrode 21 serving as an anode, an organic compound layer 22 containing a light-emitting layer and a metal electrode 23 serving as a cathode on the transparent substrate 10. The transparent electrodes 21 and the metal electrodes 23 are patterned to form lines such that the line (anode line) of the transparent electrodes 21 and the line (cathode line) of the metal electrodes 23 are allowed to intersect each other according to a positioning layout of the light-emitting elements.

The organic EL array 20 is covered with, for example, a sealing member 60 such as a stainless can. The array 20 is sealed in the sealing member 60 that is replaced by dried nitrogen gas, bonding the edge portion of the sealing member 60 and the transparent substrate 10 with a bonding agent. When a predetermined current flows between the transparent electrode 21 of the organic EL array 20 and the metal electrode 23, the light-emitting layer contained in the organic compound layer 22 located at each intersection between the anode line and the cathode line emits light. The emitted light is taken out through the transparent electrode 21 and the transparent substrate 10.

Both of the electrodes of the transparent electrode 21 and the metal electrode 23 are connected to a driving circuit 80 which independently drives (passive-matrix driving) a plurality of light-emitting elements respectively. This driving circuit 80 is constituted by an unillustrated power supply that applies a voltage between the two electrodes and an unillustrated switching element formed by transistors and thyristors.

The driving circuit 80 is controlled by a control unit 90 so as to provide exposure gradations of m-stages for each of the elements by changing at least one of the light-emitting intensity and the light-emitting time of each light-emitting element. In other words, the respective light-emitting elements are modulated and driven by using processes, such as a pulse-width modulating process, a pulse-number modulating process and an intensity-modulating process. Moreover, an organic EL array 20 may be formed on a TFT substrate on which TFTs (thin-film transistors) for driving are formed (active-matrix driving). When the TFT substrate is used, the emitted light is often taken out from the opposite side to the substrate.

The transparent substrate 10 is a transparent substrate with respect to emitted light, and may be formed by a glass substrate, a plastic substrate or the like. The transparent substrate 10 needs to have heat resistance, dimension stability, solvent resistance, electrically insulating property, processability, low air permeating property, low hygroscopic property and the like, as general substrate characteristics.

The transparent electrode (anode) 21 may be set to have a light transmittance of at least not less than 50%, often, not less than 70%, in a wavelength range of visible light of 400 nm to 700 nm. With respect to the material used for forming the transparent electrode 21, in addition to known compounds as transparent electrode material, such as tin oxide, indium tin oxide (ITO) and indium zinc oxide, metal thin films of gold and platinum having a greater work input coefficient may be used. Alternatively, organic compounds, such as polyaniline, polythiophene, polypyrrole, or derivatives of these, may be used. With respect to the transparent conductive film, applicable materials are disclosed in detail in "New Development of Transparent Conductive Film" edited by Yutaka Sawada, published by CMC publishing company (1999), and these materials are applied to the present invention. Moreover, with respect to the transparent electrodes 21, these may be formed on the transparent substrate 10 by using a vapor deposition method, a spattering method or an ion plating method.

The organic compound layer 22 may have a single layer structure made of a single light-emitting layer. The layer 22 may also be a laminated structure which, in addition to the light-emitting layer, appropriately includes other layers such as a hole injection layer, a hole transporting layer, an electron injection layer and an electron transporting layer. With respect to the specific structure of the organic compound layer 22 (shown in a manner so as to include electrodes), for example, a structure of anodes, hole injection layer, hole transporting layer, light-emitting layer, electron transporting layer, and cathodes, a structure of anodes, light-emitting layer, electron transporting layer, and cathodes and a structure of anodes, hole transporting layer, light-emitting layer, electron transporting layer, and cathodes maybe listed. With respect to the light-emitting layer, hole transporting layer, hole injection layer and electron injection layer, a plurality of these layers may be provided.

The organic EL array 20 emits light with a color that corresponds to a material of the organic compound layer. Therefore, by properly painting the material of the organic compound layer separately for each of the light-emitting elements, an organic EL array 20 can be obtained which has a plurality of light-emitting elements, and each of which emits light having any one of the colors of RGB. With respect to the respective constituent layers of the organic compound layer, such as the hole transporting layer, electron transporting layer, light-emitting layer and conductive polymer layer, known materials may be appropriately used. Here, the respective constituent layers may be formed by using a known method such as a vacuum vapor deposition method, a sputtering method, a dipping method, a spin coating method, a casting method, a bar coating method and a roll coating method. Moreover, multi-layer coating processes may be carried out by using different solvents separately.

The metal electrode (cathode) 23 may be made from a metal material such as an alkali metal, like Li and K, that has a low work input coefficient, an alkali earth metal, like Mg and Ca, and an alloy and a mixture between each of these metals and Ag or Al. In an attempt to satisfy both of maintaining stability and electron-injecting property at the cathode, the electrodes, formed by the above-mentioned materials, may be further coated with a material such as Ag, Al or Au, which has a low work input coefficient and high conductivity. Here, in the same manner as the transparent electrode 21, the metal electrode 23 may also be formed by a known method such as a vapor deposition method, a sputtering method and an ion plating method. Moreover, in the same manner as the transparent electrode 21, the metal electrode 23 may be formed by a transparent conductive film.

The SLA 30 has a plurality of SELFOC lenses 31. The SELFOC lens 31 is a rod-shaped thick lens that has a diffraction index distribution in the radius direction in its cross-section. Light, made incident on the SELFOC lens 31, is output toward a photosensitive material 40. The light proceeds while winding in a sine-wave shape with respect to the light axis, and converges on the surface of the photosensitive material 40 to form an exposed spot 70 thereon.

In order to condense the exposed spot to reduce optical cross talk, each aperture section of the SELFOC lens 31 is formed so as to be greater than each light-emitting area of the each organic EL array 20, and adjacent SELFOC lenses 31 are arranged to contact each other. Here, each SELFOC lens 31 may be provided so as to achieve one-to-one correspondence with each of the light-emitting elements of the organic EL array 20, or a one-to-N correspondence (N: integer of not less than 2) with the respective light-emitting elements. That is, one lens corresponds to a plurality of the light-emitting elements.

The photosensitive material 40 is not particularly limited as long as it is capable of providing color exposure using three colors of R, G and B. For example, a coloring silver halide photosensitive material can be used as the photosensitive material 40. Moreover, a photosensitive heat-sensitive material can be used.

Arrangement of Light-Emitting Elements

Figure 2:
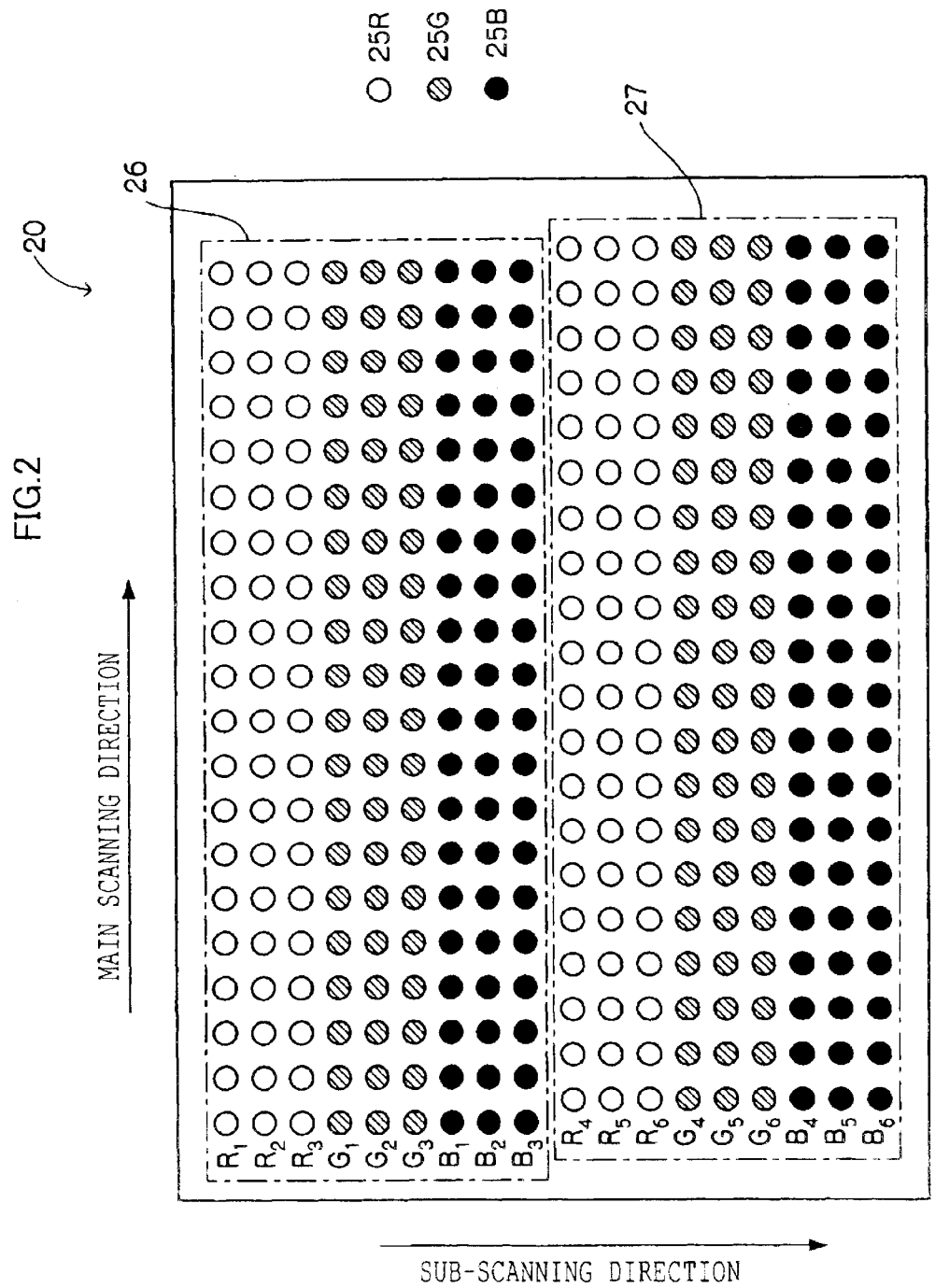
FIG. 2 is a plan view that shows an arrangement of a light-emitting section (light-emitting elements) of an organic EL array of the exposure device according to the first embodiment.

The following description will discuss an arrangement of the light-emitting elements of the organic EL array 20. As shown in FIG. 2, in the organic EL array 20, light-emitting elements 25R for emitting red (R color) light, light-emitting elements 25G for emitting green (G color) light and light-emitting elements 25B for emitting blue (B color) light are divided into a first block 26 and a second block 27 and arranged on the same substrate in a matrix form with a layout. The layout will be described later. The organic EL enables to form a number of light-emitting elements on the same substrate through a method such as a vapor deposition method. Alternatively, light-emitting elements of the respective colors of RGB may be formed on different substrates, and these three blocks may be arranged to form an array.

First, in the first block 26, a plurality of light-emitting elements 25R are aligned in the main scanning direction with predetermined intervals to form an element row R, and a plurality of element rows R are arranged in the sub-scanning direction. In the same manner, the same number of the element rows G as the element rows R, each having a plurality of light-emitting elements 25G aligned therein, are arranged in the sub-scanning direction, and the same number of element rows B as the element rows R, each having a plurality of light-emitting elements 25B, are arranged in the sub-scanning direction.

For example, in FIG. 2, in the first block 26, three element rows $R_1$ to $R_3$, each having 20 light-emitting elements 25R aligned in the main scanning direction, three element rows $G_1$ to $G_3$, each having 20 light-emitting elements 25G aligned in the main scanning direction, and three element rows $B_1$ to $B_3$, each having 20 light-emitting elements 25B aligned in the main scanning direction, are arranged in the sub-scanning direction in the order of R, G and B. Therefore, total nine light-emitting elements, each constituted by three light-emitting elements of each of RGB colors, are arranged in the sub-scanning direction.

Next, in the same manner as the first block 26, in the second block 27, element rows R, element rows G and element rows B are respectively arranged in the sub-scanning direction, in the same number as the element rows R in the first block 26; however, the respective element rows of the second block 27 are aligned with an offset of a predetermined gap from the respective element rows in the first block 26 in the main scanning direction. With this arrangement, the light-emitting elements arranged in the second block 27 can expose a gap between exposure spots derived from the light-emitting elements arranged in the first block 26.

For example, in FIG. 2, in the second block 27, three element rows $R_4$ to $R_6$, each having 20 light-emitting elements 25R aligned in the main scanning direction, three element rows $G_4$ to $G_6$, each having 20 light-emitting elements 25G aligned in the main scanning direction, and three element rows $B_4$ to $B_6$, each having 20 light-emitting elements 25B aligned in the main scanning direction, are arranged in the sub-scanning direction in the order of R, G and B. Therefore, in the same manner as the first block 26, total nine light-emitting elements, that is, three light-emitting elements for each of the three RGB colors, are arranged in the sub-scanning direction.

Multi-Gradation Exposing Method

Next, the following description will discuss an exposing method in which the above-mentioned exposure device is used to carry out a multi-gradation exposing process on a photosensitive material.

Upon receipt of a photosensitive material 40 transported thereto, the light-emitting elements 25R, 25G and 25B are lighted on in predetermined synchronized timing so that the light-emitting elements of three colors of RGB, aligned in the sub-scanning direction, are allowed to expose (multiple exposure) the same position on the photosensitive material 40. For example, in the element array shown in FIG. 2, multiple exposing processes of total 9 times, which consist of those of three times carried out by the light-emitting elements 25R for emitting light of R color, those of three times carried out by the light-emitting elements 25G for emitting light of G color and those of three times carried out by the light-emitting elements 25B for emitting light of B, are carried out.

The first block 26 and second block 27 are respectively passive-matrix-driven (dual-scanned) by the driving circuit 80 simultaneously in an independent manner. The passive-matrix driving process refers to a process in which the respective cathode lines are subjected to a time-division line-sequential scanning process so that the anode that intersects the cathode line being currently scanned is driven in response to a signal corresponding to a desired light emission, and the scanning processes are successively carried out over all the cathode lines.

Compared with a case of passive-matrix driving the entire light-emitting element groups, this method, which divides a group of light-emitting elements into a plurality of areas for passive-matrix driving each area, achieves the improved driving duty and the reduced peak light-emitting intensity. When the light-emitting element group is divided into two areas, the driving duty of each light-emitting element improves by two times and the peak light-emitting intensity is halved. Consequently, the reliability of the exposure device improves.

When exposure gradation controls of m-stages are available with respect to each light-emitting element, multiple exposing processes of the maximum n times will be conducted for each color. An exposing dose controlling process using gradations represented by $\{n\times(m-1)+1\}$ stages with respect to shadow through highlight will be available for each color. In other words, if the light-emitting color is the same, the number of possible gradations when multiple exposing processes are conducted by a plurality of light-emitting elements is the sum of possible gradations of the respective elements. This is because the number of possible densities of the color to be developed by the light-emitting color represents the number of gradations. When exposure gradation controls in m-stages are available for each element, n-number of elements having the same light-emission colors will be used to carry out multiple exposing processes. Exposure with the density from the minimum 0 to the maximum $n\times(m-1)$ is available and the number of exposure gradations is set to $\{n\times(m-1)+1\}$. Here, when the light-emission colors are different, the hue is expressed by a combination of densities of the respective colors so that upon multiple-exposing by using a plurality of colors, the possible number of gradations is the product of multiplying the numbers of possible gradations of the respective colors. Therefore, assuming that multiple exposing processes are conducted n times for each of the RGB three colors, full-color color developments (gradation expressions) of $\{n\times(m-1)+1\}^3$ ways can be performed.

For example, with respect to each light-emitting element in the organic EL array 20 of the present embodiment, exposure gradation controls of 8 bits ($2^8$=256) are assumed to be available. When exposing three times for each of the RGB colors, an exposing dose control of 766 gradations becomes available for each color. Thereby full-color color developments of $766^3$=449,455,096 ways can be performed. In other words, in the conventional exposure device, which carries out an exposing process once for each of the RGB colors, the number of color developments and expressions is $256^3$=16777216 ways. When exposing process of three times are carried out on each of the RGB colors, approximately 27 times as many color developments and expressions as those of the conventional method can be achieved.

FIG. 3 shows an example in which exposure gradations are assigned to the respective light-emitting elements. In this example, a light-emitting element capable of carrying out exposure gradation controls in 256 stages for each exposure is used. With respect to the three light-emitting elements of the R color (R element 1, R element 2 and R element 3), aligned in the sub-scanning direction, the respective gradations represented by 766 stages are almost evenly assigned to these three light-emitting elements. The order of the alignments of R element 1, R element 2 and R element 3 is desirably set. Further, with respect to the light-emitting elements of G color and the light-emitting elements of B color, the assigning process of the exposure gradations is carried out in the same manner as the above. Moreover, as shown in FIG. 4, the exposure gradations may be assigned to the respective light-emitting elements in an uneven manner.

The above-mentioned assigning method for exposure gradations in which exposure gradations are assigned substantially in an even manner can be generalized in the following manner. Here, this generalization will be explained for a case as follows. In this case, exposures are carried out n times for the R color by using n-number of light-emitting elements so as to control the exposing dose with 766 gradations. Based upon input image data, a specific pixel is exposed with an exposing dose X. The exposing dose X is a minimum exposing dose unit, and given as an integer. An exposing dose control with 766 gradations is assumed to perform. The exposing dose X is given as any integer in a range from 0 to 765 in response to each stage of the 766 gradations. The greater the numeric value becomes, the more the exposing dose will increase. By using these X value and n value, p value and q value are calculated. As shown in the following equation, p value is provided as a dividend when X is divided by n.

$p=\mathrm{mod}(X, n)$

As shown in the following equation, q value is given as a value obtained by rounding a quotient derived from a division of X by using n to an integer nearest to 0.

$q=INT(X/n)$

Here, exposure gradations may be assigned so that, among n-number of light-emitting elements, desired p-number of them are allowed to have an exposing dose of (q+1), with the rest (n−p) number of the light-emitting elements being allowed to have an exposure dose of q. For example, when exposure dose 241 is assigned to three light-emitting elements, because p value is 1 and q value is 80, an exposure gradation is assigned to one of the light-emitting elements so as to set its exposing dose to 81, and exposure gradations are assigned to the rest two light-emitting elements so as to set the exposing dose to 80.

Based upon the exposure gradations assigned by using the above-mentioned method, n-number of light-emitting elements of R color respectively expose the same position on a photosensitive material n times so that the exposing dose X, determined for each of the pixels, is given. The same exposing processes are carried out with respect to B color and G color so that an exposing dose corresponding to image data is given for each of the RGB colors.

As described above, in the exposure device according to the present embodiment, an organic EL array in which total 3n number of light-emitting elements, which includes n number of them for each of the RGB colors, are arranged in the sub-scanning direction is prepared. Therefore, exposing processes of n-times for each of the colors, that is, exposing processes of total 3n-times, can be carried out on the same position of the photosensitive material by a sub-scanning process of one time. Accordingly, when exposure gradation controls of m-stages are independently available for each of the light-emitting elements, and multiple exposing processes of the maximum n times are carried out for each of the respective colors, exposing dose controls of $\{n \times (m-1)+1\}$ gradations can be performed for each of the colors. When performing multiple exposing processes of n times for each of the RGB colors, a full-color color developments and expressions (gradation expressions) in $\{n \times (m-1)+1\}^3$ ways can be obtained. In other words, compared with the conventional exposure device which carries out an exposing process once for each of the RGB colors, the number of exposure gradations, color developments and expressions for each of the colors will increase significantly. Thus, a wide range of color reproductions with super high precision and high quality images can be achieved.

Moreover, even when fixing the number of gradations, compared with the conventional exposure device, the sub-scanning speed will improve beyond the limitation of response speeds of a light-emitting element and a drive circuit that drives this light-emitting element. In the case of a fixed sub-scanning speed, the light-emitting intensity of each light-emitting element can reduce as well. Consequently the reliability of the exposure device will improve.

Because not area gradation but exposure gradation for controlling the dose of exposure is adopted, the number of color developments and expressions can increase without impairing the spatial resolution.

Second Embodiment

An exposure device according to the present embodiment has the same structure as that of the first embodiment, except that the arrangement of the light-emitting elements of the organic EL array 20 is changed. Thus, with respect to the same constituent parts, the description thereof is omitted, and only the arrangement of the light-emitting elements and the exposing method, which form different points, will be explained.

Arrangement of Light-Emitting Elements

Figure 5:
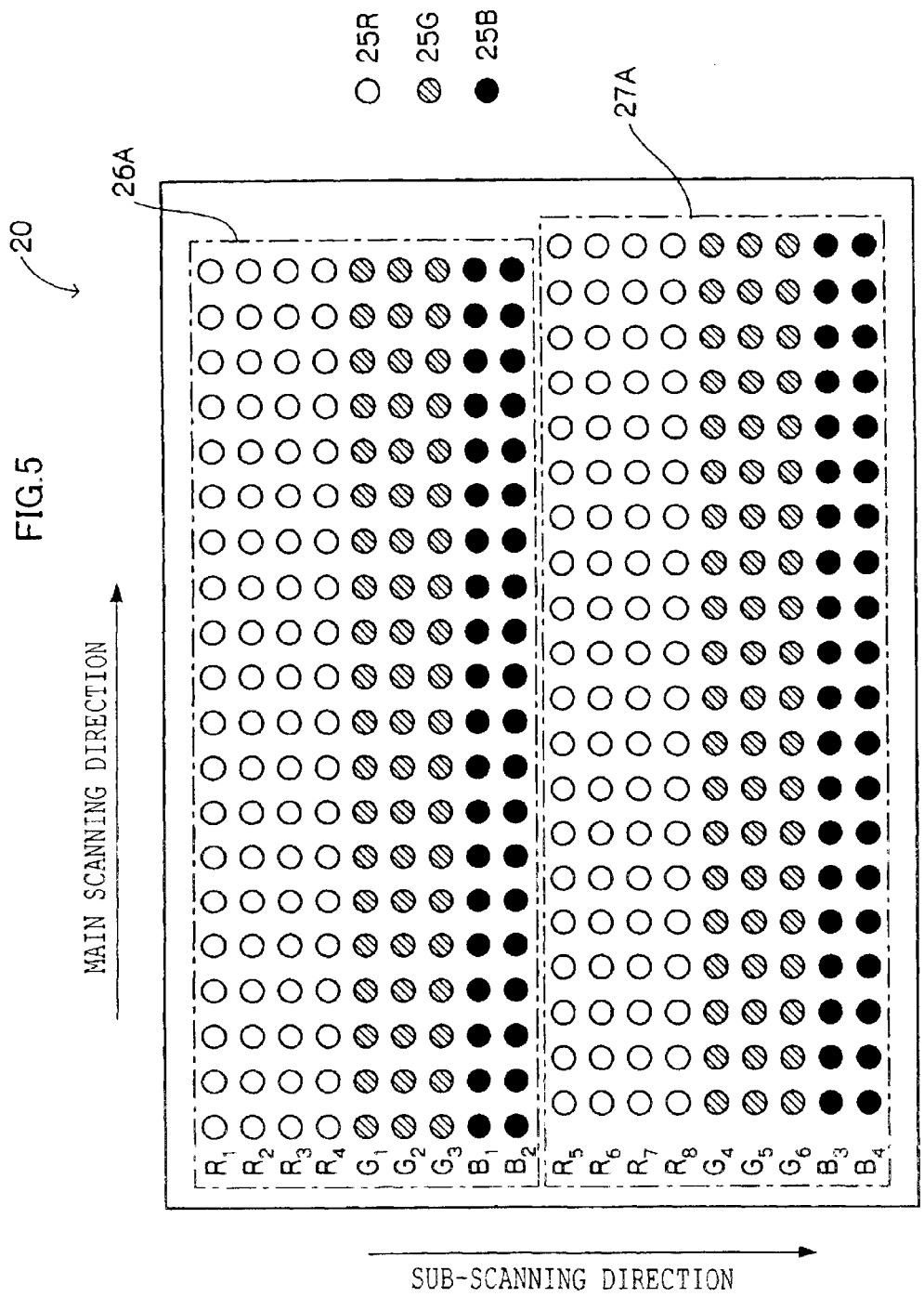
FIG. 5 is a plan view that shows an arrangement of light-emitting elements in an organic EL array of an exposure device according to a second embodiment.
Figure 8:
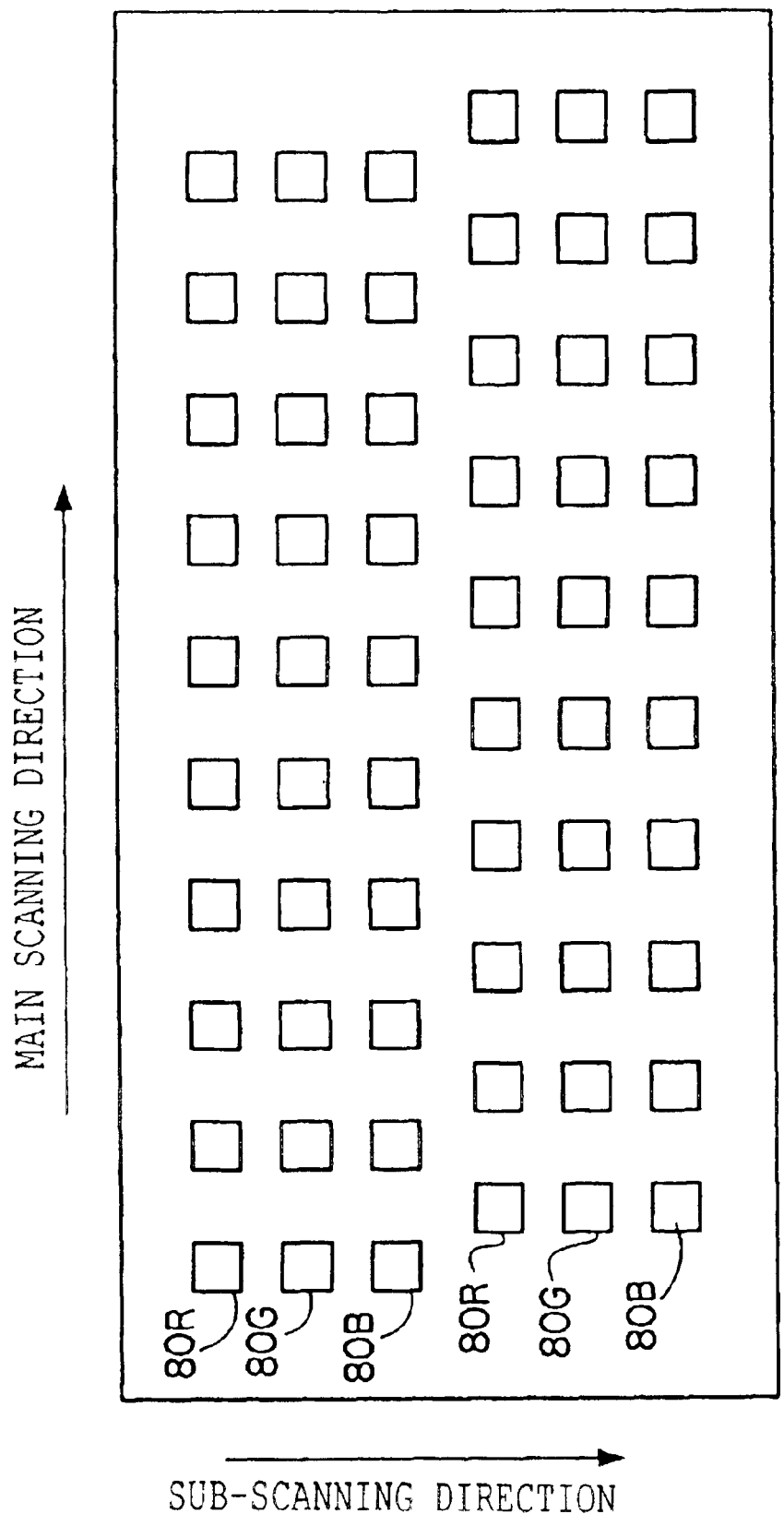
FIG. 8 is a cross-sectional view that shows a structure of a conventional exposure device.

As shown in FIG. 5, in the organic EL array 20, light-emitting elements 25R for emitting red (R color) light, light-emitting elements 25G for emitting green (G color) light and light-emitting elements 25B for emitting blue (B color) light are arranged on a single substrate in a matrix form with a layout. The layout will be described later. These elements are divided into two blocks, a first block 26A and a second block 27A.

First, in the first block 26A, a plurality of light-emitting elements 25R are aligned in the main scanning direction with predetermined intervals to form an element row R, and a plurality ($n_R$) of element rows R are arranged in the sub-scanning direction. In the same manner, a plurality ($n_G$) of element rows G, each having a plurality of light-emitting elements 25G aligned thereon, are arranged in the sub-scanning direction, and a plurality ($n_B$) of element rows B, each having a plurality of light-emitting elements 25B aligned thereon, are arranged in the sub-scanning direction. Here, at least one of aligned rows of the number $n_R$ of the element rows R, the number $n_G$ of the element rows G and the number $n_B$ of the element rows B is different from the other numbers of aligned rows.

The number of aligned rows of each of the element rows R, element rows G and element rows B can be changed according to the sensitivity of a photosensitive material. For example, when a silver halide photosensitive material (color paper) is used as the photosensitive material 40, the sensitivities of the respective RGB colors to light become higher in the order of R color, G color and B color. Therefore, when the same number of aligned rows is used with respect to the RGB colors, it is necessary to increase the light-emitting intensities in the order of B color, G color and R color. This case tends to cause a problem of short service life in the light-emitting elements of R color. In contrast, by increasing the number of aligned rows of the light-emitting elements of R color so as to be greater than the numbers of aligned rows of the light-emitting elements of the other colors, the light-emitting intensity (time-averaged) will reduce for each of the light-emitting elements of R color. Consequently shortening of service life will not be caused. For example, the respective numbers of aligned rows $n_R$, $n_G$ and $n_B$ are determined so as to satisfy the following relational expression: $n_R > n_G > n_B$ or $n_R = n_G + n_B$. When photosensitive materials in which the sensitivity of the color become higher in the order of R color, G color and B color are used, the numbers of aligned rows of the respective RGB colors are often increased in the order of B color, G color and R color in order to assign the greatest number of rows to the R color that has the lowest sensitivity.

For example, in FIG. 5, in the first block 26A, four element rows $R_1$ to $R_4$, each having 20 light-emitting elements 25R aligned in the main scanning direction, three element rows $G_1$ to $G_3$, each having 20 light-emitting elements 25G aligned in the main scanning direction and two element rows $B_1$ and $B_2$, each having 20 light-emitting elements 25B aligned in the main scanning direction, are arranged in the sub-scanning direction in the order of RGB. Thus, the total 9 light-emitting elements, that is, four light-emitting elements of R color, three light-emitting elements of G color and two light-emitting elements of B color, are aligned in the sub-scanning direction.

Next, in the second block 27A, in the same manner as the first block 26A, the $n_R$-number of element rows R, $n_G$-number of element rows G and $n_B$-number of element rows B are respectively arranged in the sub-scanning direction. The respective element rows of the second block 27A are placed in the main scanning direction with an offset of a predetermined gap in the main scanning direction from the respective element rows in the first block 26A. With this arrangement, the light-emitting elements arranged in the second block 27A can expose a gap between exposure spots derived from the light-emitting elements arranged in the first block 26A.

For example, in FIG. 5, in the second block 27A, four element rows $R_5$ to $R_8$, each having 20 light-emitting elements 25R aligned in the main scanning direction, three element rows $G_4$ to $G_6$, each having 20 light-emitting elements 25G aligned in the main scanning direction and two element rows $B_3$ and $B_4$, each having 20 light-emitting elements 25B aligned in the main scanning direction, are arranged in the sub-scanning direction in the order of RGB. Thus, in the same manner as the first block 26A, the total 9 light-emitting elements, that is, four light-emitting elements of R color, three light-emitting elements of G color and two light-emitting elements of B color, are aligned in the sub-scanning direction.

Figure 14:
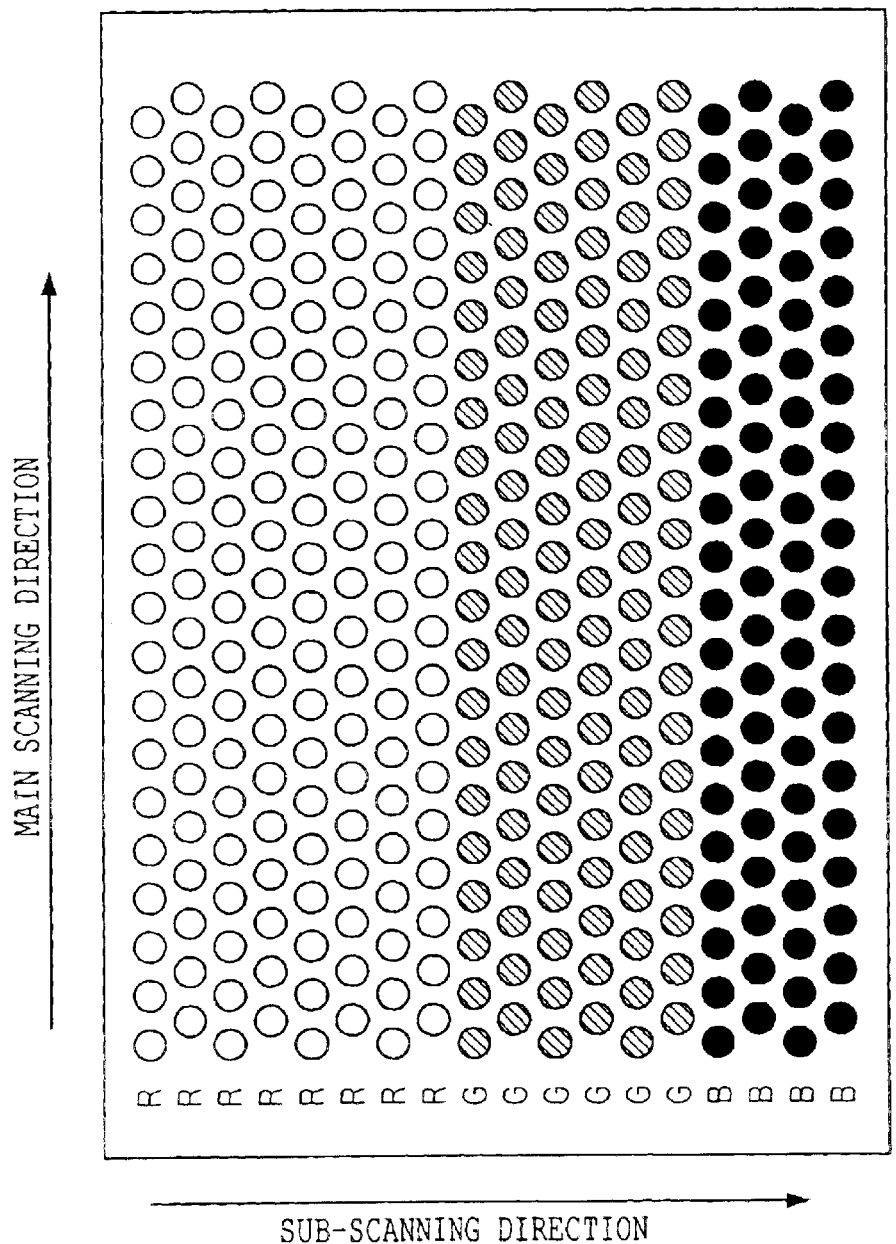
FIG. 14 is a plan view that shows another arrangement of a light-emitting section (light-emitting elements) of an organic EL array of the exposure device according to the first embodiment.

Here, in this example, explanations have been given of an arrangement in which a plurality of blocks, each having a plurality of light-emitting elements arranged in a matrix form, are formed. However, as shown in FIG. 14, a plurality of light-emitting elements may be arranged in alternate rows. Multi-gradation exposing method Next, the following description will discuss an exposing method in which the above-mentioned exposure device is used to carry out a multi-gradation exposing process on a photosensitive material.

Upon receipt of a photosensitive material 40 transported thereto, during a sub-scanning process of one time, the light-emitting elements 25R, 25G and 25B of the organic EL array 20 are lighted on in predetermined synchronized timing so that the light-emitting elements of three colors of RGB, aligned in the sub-scanning direction, are allowed to expose (multiple exposure) the same position on the photosensitive material 40. For example, in the element array shown in FIG. 5, multiple exposing processes of total 9 times, which consist of those of four times carried out by the light-emitting elements 25R for emitting light of R color, those of three times carried out by the light-emitting elements 25G for emitting light of G color and those of two times carried out by the light-emitting elements 25B, are carried out.

The first block 26A and second block 27A are respectively passive-matrix-driven by a driving circuit simultaneously in an independent manner. In comparison with a case in which all the light-emitting element group is passive-matrix driven, this method, which divides a group of light-emitting elements into a plurality of areas in order to passive-matrix driving each area, will achieve the improved driving duty of each light-emitting element and the reduced peak light-emitting intensity. Consequently, the reliability of the exposure device will improve.

When exposure gradation controls of mi-stages (i=R, G, B) are available with respect to light-emitting elements having the respective colors, and multiple exposing processes of the maximum ni times (i=R, G, B) are carried out on each color, an exposing dose controlling process using gradations represented by $\{ni \times (mi-1)+1\}$ stages with respect to shadow through highlight for each color is available. As described above, although the ni values are not the same with respect to the RGB three colors, the $m_i$ values may be the same with respect to the RGB three colors or may be set to different values.

In other words, if the light-emitting color is the same, because the number of gradations is the number of possible densities of the color to be developed by the light-emitting color, the number of possible gradations when multiple exposing processes are carried out by a plurality of light-emitting elements is the sum of possible gradations of the respective elements. When exposure gradation controls in $m_i$-stages are available for each element, assuming that $n_i$-number of elements having the same light-emission color are used to carry out multiple exposing processes, exposure having densities from the minimum 0 to the maximum $n_i \times (m_i-1)$ is available with the number of exposure gradations being set to $\{n_i \times (m_i-1)+1\}$. Here, when the light-emission colors are different, the hue is expressed by a combination of densities of the respective colors and upon multiple-exposing by using a plurality of colors, the possible number of gradations is the product of multiplying the numbers of possible gradations of the respective colors.

For example, as shown in FIG. 6, the value of $m_i$ can be set according to the value of $n_i$ so as to set the number of exposure gradations $\{n_i \times (m_i-1)+1\}$ to the same value with respect to the RGB colors. In this way, when multiple exposing processes are carried out by using the RGB three colors, full-color color developments of $\{n_i \times (m_i-1)+1\}^3$ ways can be performed.

In an example shown in FIG. 6, exposing processes of four times are carried out by using the light-emitting elements 25R of R color which can carry out exposure gradation controls of 256 stages in an exposing process at one time, exposing processes of three times are carried out by using the light-emitting elements 25G of G color which can carry out exposure gradation controls of 341 stages in an exposing process at one time and exposing processes of two times are carried out by using the light-emitting elements 25B of B color which can carry out exposure gradation controls of 511 stages in an exposing process at one time. Thus, exposing dose controls of 1021 gradations are available for each of the colors, and full-color color developments of $1021^3=1,064,332,261$ ways can be performed. In other words, in this case, about 63 times as many color developments and expressions can be achieved as those of the conventional exposure device that carries out an exposing process once for each of the RGB colors Moreover, as shown in FIG. 7, the numbers of exposure gradations $\{n_i \times (m_i-1)+1\}$ of the respective RGB colors are not necessarily coincident with each other. When $\{n_R \times (m_R-1)+1\}$ gradations are available with respect to R color, with $\{n_G \times (m_G-1)+1\}$ gradations and $\{n_B \times (m_B-1)+1\}$ gradations being available with respect to G and B colors respectively, upon carrying out multiple exposing processes by using the respective RGB colors, full-color color developments of $\{n_R \times (m_R-1)+1\} \cdot \{n_G \times (m_G-1)+1\} \cdot \{n_B \times (m_B-1)+1\}$ ways can be performed.

In an example shown in FIG. 7, exposing processes of four times are carried out by using the light-emitting elements 25R of R color which can carry out exposure gradation controls of 256 stages in an exposing process at one time, exposing processes of three times are carried out by using the light-emitting elements 25G of G color which can carry out exposure gradation controls of 512 stages in an exposing process at one time and exposing processes of two times are carried out by using the light-emitting elements 25B of B color which can carry out exposure gradation controls of 512 stages in an exposing process at one time. Thus, exposing dose controls of 1021 gradations are available for R color, exposing dose controls of 1534 gradations are available for G color, and exposing dose controls of 1023 gradations are available for B color. Consequently, full-color color developments of $1,021 \times 1,534 \times 1,023=1,602,236,922$ ways can be performed. In other words, in this case, about 96 times as many color developments and expressions can be achieved as those of the conventional exposure device that carries out an exposing process once for each of the RGB three colors.

In an attempt to express gray color, the exposing doses of the RGB three colors needs controlling in order to make the color densities of C (cyan), M (magenta) and Y (yellow) that are color-developed by silver salt photosensitive materials upon exposing the RGB three colors substantially equal to each other. By setting the numbers of exposure gradations of the respective colors to the same value, gray gradations can be expressed correctly from black to white according to the respective exposure gradations. When the numbers of exposure gradations of the respective colors are different from each other, expressing gray color correctly will sometimes become difficult. Even if correct gray expression is principally not available, no practical problem is raised as long as the precision is set to be beyond the human visibility.

In comparison with a case in which all the light-emitting element group is passive-matrix driven, this method, which divides a group of light-emitting elements into a plurality of areas in order to passive-matrix driving each area, achieves the improved driving duty of each light-emitting element and the reduced peak light-emitting intensity. Consequently, the reliability of the exposure device will improve.

In the exposure device according to the present embodiment, an organic EL array in which total $(n_R+n_G+n_B)$ number of light-emitting elements, that is, $n_R$ number of light-emitting elements of R color, $n_G$ umber of light-emitting elements of G color and $n_B$ number of light-emitting elements of B color, are arranged in the sub-scanning direction is provided. Therefore, total $(n_R+n_G+n_B)$ number of exposing processes, that is, $n_R$ times of those in R color, $n_G$ times of those of G color and $n_B$ times of those in B color, are carried out at the same position on a photosensitive material. Therefore, when exposure gradation controls of mi (i=R, G, B) stages are independently available for a light-emitting element of each color, assuming that multiple exposing processes of the maximum ni (i=R, G, B) times are carried out on each of the colors, exposing dose controls of $\{n_R \times (m_R-1)+1\}$ gradations with respect to R color, $\{n_G \times (m_G-1)+1\}$ gradations with respect to G color and $\{n_B \times (m_B-1)+1\}$ gradations with respect to B color are available. When multiple exposing processes are carried out on each of the RGB colors, full-color color developments of $\{n_R \times (m_R-1)+1\} \cdot \{n_G \times (m_G-1)+1\} \cdot \{n_B \times (m_B-1)+1\}$ ways can be performed. In other words, compared with the conventional exposure device, which carries out an exposing process once for each of the RGB colors, the number of exposure gradations and color developments and expressions for each of the colors will increase significantly. Consequently, a wide variety of color reproductions with super high precision and high quality images can be obtained.

Even when fixing the number of gradations, compared with the conventional exposure device, the sub-scanning speed can increase beyond the limitation of response speeds of a light-emitting element and a driving circuit that drives this light-emitting element. When fixing the sub-scanning speed, the light-emitting intensity of each light-emitting element can reduce. Consequently, the reliability of the exposure device improves.

Furthermore, since not area gradation but exposure gradation for controlling the dose of exposure is adopted, the number of color developments and expressions can increase without impairing the spatial resolution.

Third Embodiment

An exposure device according to the present embodiment has the same structure as that of the first embodiment, except that the arrangement of the light-emitting elements of the organic EL array 20 is changed and that the driving circuit is formed on a substrate. Therefore, with respect to the same constituent parts, the description thereof is omitted, and only the arrangement of the light-emitting elements, the layout of the driving circuit and the exposing method, which form different points, will be explained.

Arrangement of Light-Emitting Elements

Figure 9:
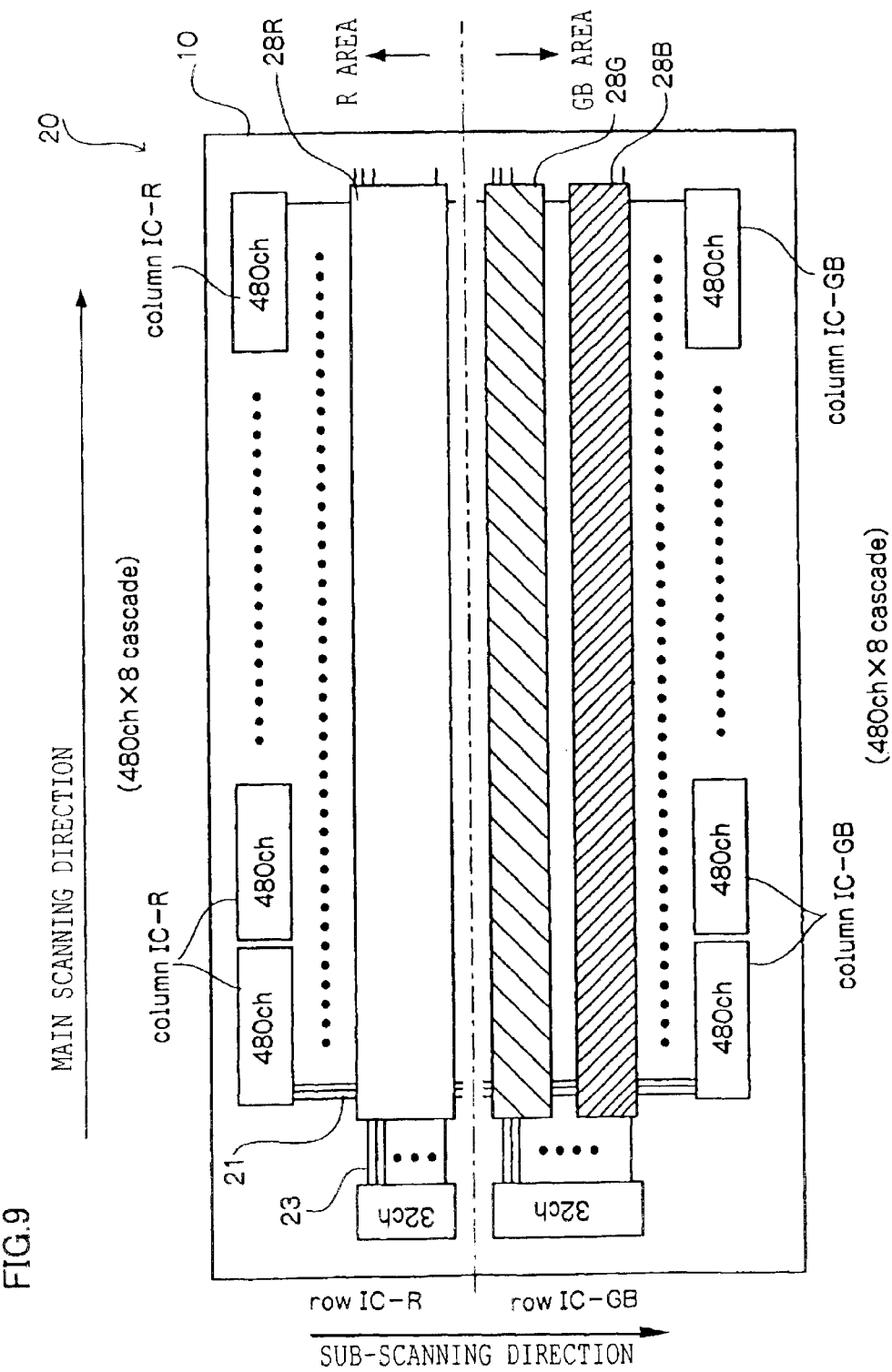
FIG. 9 is a plan view that shows an arrangement of light-emitting elements of an organic EL array and a layout of a driving circuit in an exposure device according to a third embodiment.

As shown in FIG. 9, the organic EL array 20, formed on a substrate 10, is constituted by R area 28R in which light-emitting elements 25R of R color are arranged and GB area including G area 28G in which light-emitting elements 25G of G color are arranged and B area 28B in which light-emitting elements 25B of B color are arranged. With respect to each of the R area and GB area, the layout of the respective light-emitting elements is a simple-matrix layout.

Moreover, on the substrate 10, a cathode-use driving circuit row IC-R and an anode-use driving circuit column IC-R are placed so as to drive the simple matrix of R area, and a cathode-use driving circuit row IC-GB and an anode-use driving circuit column IC-GB are placed so as to drive the simple matrix of GB area. These circuits are formed in a manner so as to surround the respective areas having the light-emitting elements arranged therein.

R area and GB area are respectively passive-matrix-driven (dual-scanned) by these circuits simultaneously in an independent manner. The passive-matrix driving process refers to a process in which the respective cathode lines are subjected to a time-division line-sequential scanning process so that the anode that intersects the cathode line being currently scanned is driven in response to a signal corresponding to a desired light emission, and the scanning processes are successively carried out over all the cathode lines.

In comparison with a case in which all the light-emitting element group is passive-matrix driven, this method, which divides a group of light-emitting elements into a plurality of areas so that each area is passive-matrix driven, achives the improved driving duty of each light-emitting element and the reduced peak light-emitting intensity. When the light-emitting element group is divided into two areas, the driving duty of each light-emitting element is improved by two times so that the peak light-emitting intensity is reduced to one-half. Consequently, the reliability of the exposure device can improve.

Figure 10:
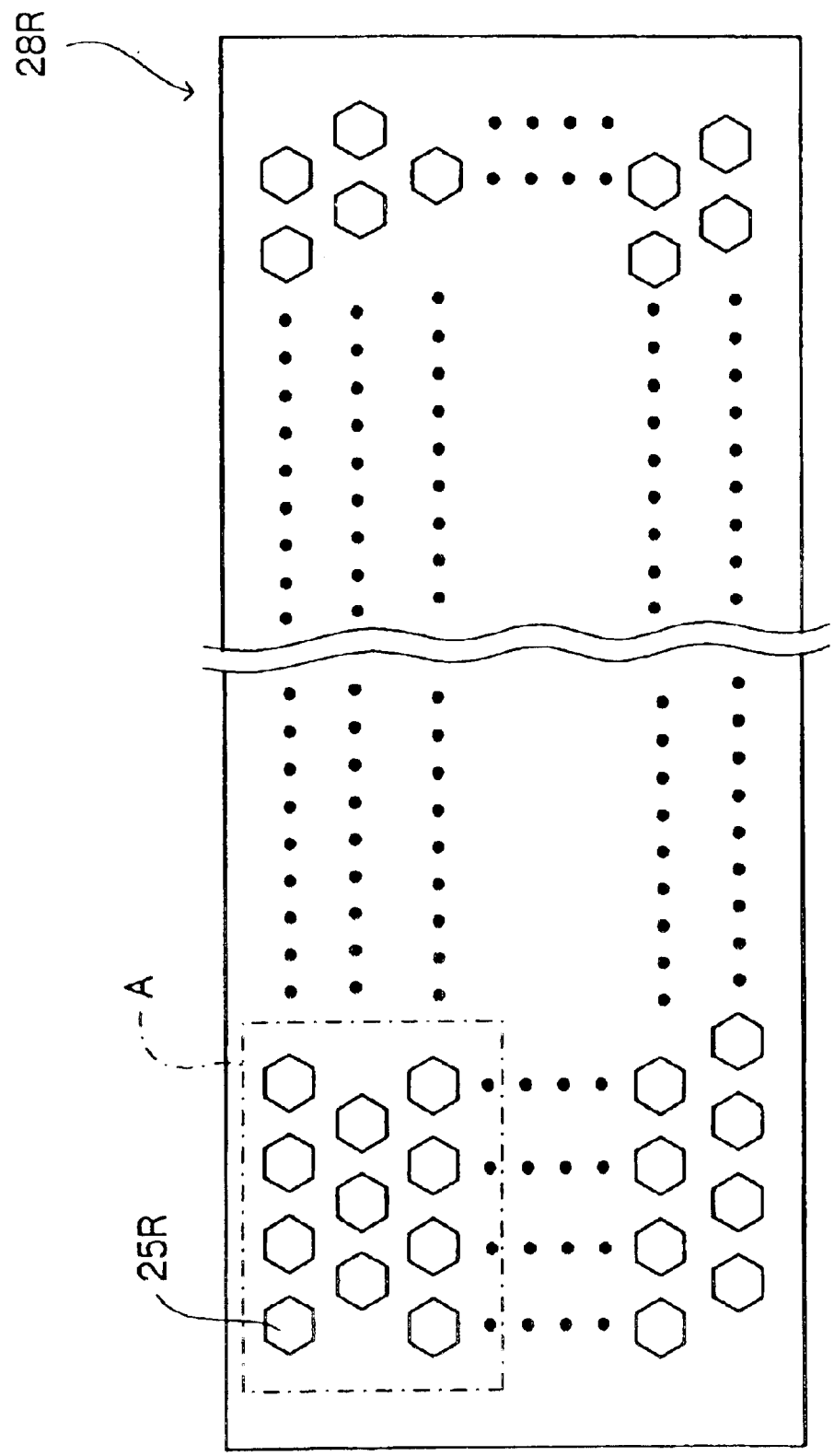
FIG. 10 is a plan view that shows an arrangement of light-emitting elements in an R area of an organic EL array shown in FIG. 9.

As shown in FIG. 10, in R area 28R, a plurality of light-emitting elements 25R, each having substantially a hexagonal shape, are aligned in the main scanning direction with predetermined intervals to form an element row R, and the same number of light-emitting elements 25R are placed with a predetermined offset in the main scanning direction from the element row R to constitute an element row R'. These element rows R and R' respectively form a plurality of sets of rows ($n_R$), and these sets of rows are alternately arranged in the sub-scanning direction so that a plurality of light-emitting elements 25R are placed to form a so-called staggered arrangement. By placing the light-emitting elements in the staggered arrangement, the light-emitting elements of the element row R' can expose a gap between exposure spots derived from the light-emitting elements of the element row R.

In the same manner, in G area 28G, element rows G, G', each having a plurality of light-emitting elements 25G aligned in the main scanning direction with a predetermined gap, are allowed to form sets of a plurality of rows ($n_G$), and these sets of rows are arranged alternately in the sub-scanning direction. In B area 28B, element rows B, B', each having a plurality of light-emitting elements 25B aligned in the main scanning direction with a predetermined gas, are allowed to form sets of a plurality of rows ($n_B$), and these sets of rows are arranged alternately in the sub-scanning direction.

As described above, when a silver halide photosensitive material is used as the photosensitive material 40, the number of aligned rows $n_R$ of the light-emitting elements of R color that have low sensitivity is made greater than the number of aligned rows $n_G$, $n_B$ of the other colors. Consequently, the light-emitting intensity (time-averaged) can reduce for each of the light-emitting elements of R color and the reliability of the exposure device can improve.

Figure 11:
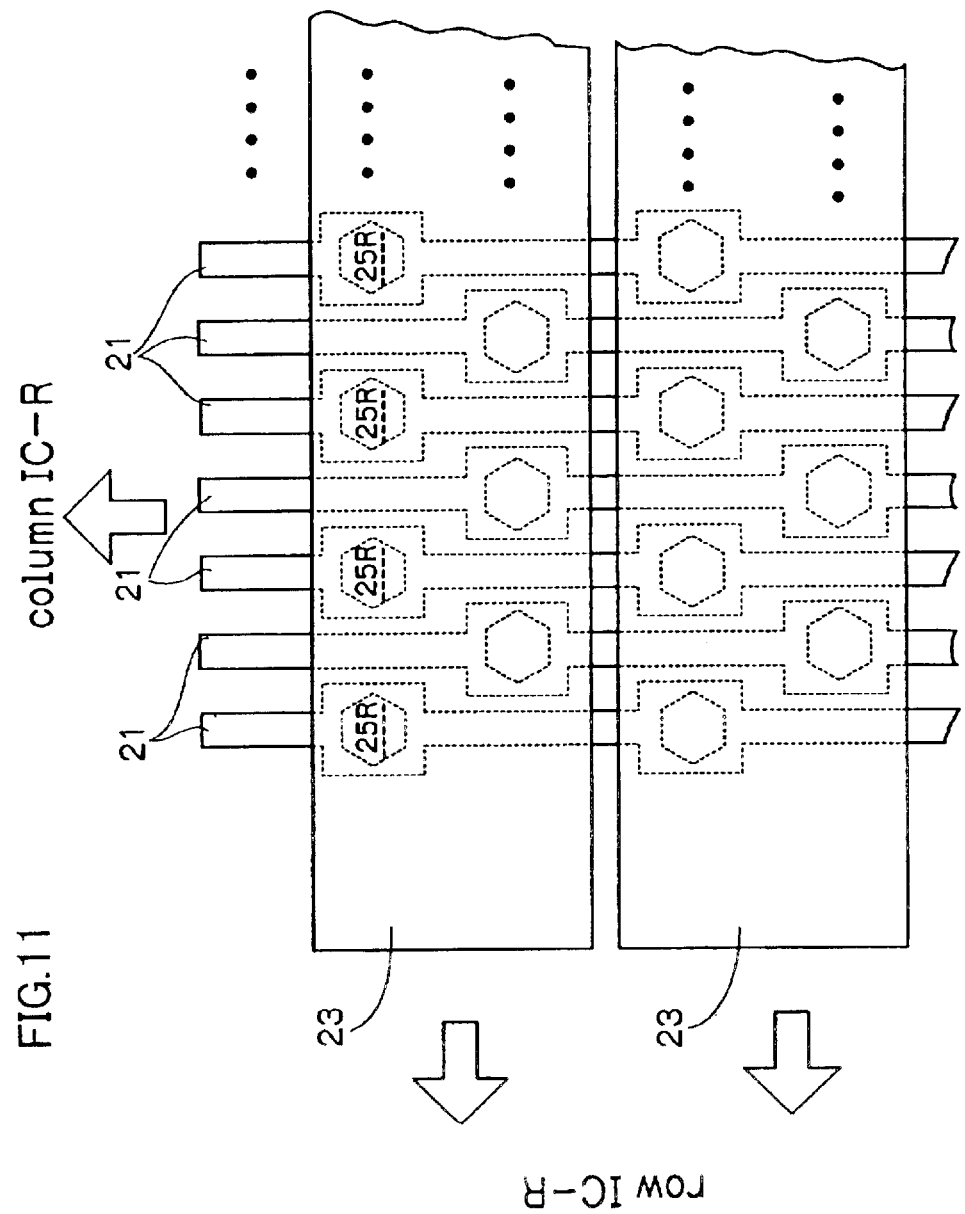
FIG. 11 shows an enlarged view of portion A shown in FIG. 10.

FIG. 11 is an enlarged drawing that shows portion A of FIG. 10. As shown in FIG. 11, an element row R and an element row R' that are adjacent to each other are formed on a single cathode line (line of metal electrode 3). In other words, two element rows, which form a set of rows, are formed on a single cathode line, and driven by the single cathode line. Thus, compared with a case in which one cathode line is assigned to each row, the number of cathode lines can be halved. Thereby the driving circuit and the control circuit can be simplified.

For example, as shown in FIG. 9, in R area, element rows R, R', each having 1920 light-emitting elements 25R aligned thereon, are prepared, and 32 sets of these including 64 rows are arranged, and in GB area, element rows G, G', each having 1920 light-emitting elements 25G aligned thereon, are prepared, and 16 sets of these including 32 rows are arranged and element rows B, B', each having 1920 light-emitting elements 25B aligned thereon, are prepared, and 16 sets of these including 32 rows are arranged. In this case, total 64 light-emitting elements, that is, 32 light-emitting elements of R color, 16 light-emitting elements of G color and 16 light-emitting elements of B color, are arranged.

In this example, the number of aligned rows of the red light-emitting elements 25R is made greater than the number of aligned rows of the green light-emitting elements 25G and the number of aligned rows of the blue light-emitting elements 25B; however, an increased number of aligned rows of the red light-emitting elements 25R is not necessarily required. Nevertheless, by increasing the number of aligned rows of the red light-emitting elements 25R, the peak light-emitting intensity can reduce of the red light-emitting elements 25R.

In order to drive the light-emitting elements 25R in R area, 32 cathode lines and 3840 anode lines are required. Here, the anode lines in R area and the anode lines in GB area are mutually driven in an independent manner. In FIG. 9, 32 cathode lines are driven by a single cathode-use driving circuit row IC-R with 32 channels, and 3840 anode lines are driven by eight anode-use driving circuits column IC-R with 480 channels, which are placed in parallel with each other, and cascade-connected.

In the same manner, in order to drive the light-emitting elements 25G and light-emitting elements 25B in GB area, 32 cathode lines and 3840 anode lines are required. In FIG. 9, in the same manner as R area, 32 cathode lines are driven by a single cathode-use driving circuit row IC-GB with 32 channels, and 3840 anode lines are driven by eight anode-use driving circuits column IC-GB with 480 channels, which are placed in parallel with each other, and cascade-connected.

Here, the assigning method in the driving circuit is not intended to be limited by the above-mentioned method. For example, 32 cathode lines in R area and 32 cathode lines in GB area may be driven by a single cathode-use driving circuit with 64 channels, which is capable of dual scanning. Moreover, in order to drive 3840 anode lines, 10 anode-use driving circuits with 384 channels or a single anode-use driving circuit with 3840 channels may be used in place of eight anode-use driving circuit with 480 channels.

Multi-Gradation Exposing Method

Next, the following description will discuss an exposing method in which the above-mentioned exposure device is used to carry out a multi-gradation exposing process on a photosensitive material.

Upon receipt of a photosensitive material 40 transported thereto, the light-emitting elements 25R, 25G and 25B are lighted on in predetermined synchronized timing so that the light-emitting elements of three colors of RGB, aligned in the sub-scanning direction, are allowed to expose (multiple exposure) the same position on the photosensitive material 40. For example, in the element array shown in FIG. 9, multiple exposing processes of total 64 times, which consist of those of 32 times carried out by the light-emitting elements 25R for emitting light of R color, those of 16 times carried out by the light-emitting elements 25G for emitting light of G color and those of 16 times carried out by the light-emitting elements 25B for emitting light of B color, are carried out.

When exposure gradation controls of mi (i=R, G, B) stages are independently available for a light-emitting element of each color, assuming that multiple exposing processes of the maximum ni (i=R, G, B) times are carried out on each of the colors, exposing dose controls, which use gradations that represent a range from shadow to highlight with $\{ni \times (mi-1)+1\}$ stages for each of the colors, are available. As described earlier, the values of ni do not become the same value with respect to the RGB three colors, the values of mi may be the same value, or may be different values with respect to the RGB three colors.

For example, as shown in FIG. 12, exposing processes of 32 times are carried out by using light-emitting elements 25R of R color capable of controlling exposure gradations in 128 stages (7 bits) at a single exposing process, exposing processes of 16 times are carried out by using light-emitting elements 25G of G color capable of controlling exposure gradations in 256 stages (8 bits) at a single exposing process, and exposing processes of 16 times are carried out by using light-emitting elements 25B of B color capable of controlling exposure gradations in 256 stages (8 bits) at a single exposing process. Therefore, with respect to R color, exposing dose controls of 4065 gradations are available with respect to R color, those of 4081 gradations are available with respect to G color, and those of 4081 gradations are available with respect to B color. Thus, full-color color developments and expressions can be performed in 4,065×4,081×4,081=67,700,790,465 ways. In other words, in this case, approximately 4,037 times as many color developments and expressions can be achieved as those of the conventional exposure device which carries out an exposing process once for each of the RGB colors.

As described earlier, in the exposure device according to the present embodiment, even when photosensitive materials that make the sensitivities of the respective colors become higher in the order of R color, G color and B color are used, an arrangement in which the numbers of aligned rows of the respective RGB colors are determined so as to assign the greatest number of rows to the R color having the lowest sensitivity is used. Therefore, compared with a case in which the numbers of aligned rows of the respective RGB colors are equal to each other, the light-emitting intensity of the light-emitting elements of R color can be reduced on a time-average basis. Consequently, the service life of the light-emitting elements of R color will prolong, and the reliability of the exposure device will improve.

In particular, the present embodiment divides a group of light-emitting elements into a plurality of areas so that each area is simultaneously passive-matrix driven in an independent manner. Therefore, compared with a case in which all the light-emitting element group is passive-matrix driven, the driving duty of each light-emitting element will improve and the peak light-emitting intensity will reduce. Consequently, the reliability of the exposure device will improve.

As described above, in the same manner as the second embodiment, the exposure device according to the present embodiment is provided with an organic EL array in which total ($n_R+n_G+n_B$) number of light-emitting elements, that is, $n_R$ number of light-emitting elements of R color, $n_G$ umber of light-emitting elements of G color and $n_B$ number of light-emitting elements of B color, are arranged in the sub-scanning direction is provided. Therefore, when multiple exposing processes are carried out on each of the RGB colors, full-color color developments of $\{n_R \times (m_R-1)+1\} \cdot \{n_G \times (m_G-1)+1\} \cdot \{n_B \times (m_B-1)+1\}$ ways can be performed. In other words, compared with the conventional exposure device which carries out an exposing process once for each of the RGB three colors, the number of exposure gradations and color developments and expressions for each of the colors will increase significantly. Consequently, a wide variety of color reproductions can be achieved with super high precision and high quality images.

Moreover, even in the case of a fixed number of gradations, the sub-scanning speed will improve beyond the limitation of response speeds of a light-emitting element and a driving circuit that drives this light-emitting element. When fixing the sub-scanning speed, the light-emitting intensity can reduce of each light-emitting element. Consequently the reliability of the exposure device will improve.

Moreover, with an arrangement in which a group of light-emitting elements divided into a plurality of areas so that each area is simultaneously passive-matrix driven in an independent manner, compared with a case in which all the light-emitting element group is passive-matrix driven, the driving duty of each light-emitting element will improve, and the peak light-emitting intensity will reduce. Consequently the reliability of the exposure device will improve.

In particular, in the present embodiment, when photosensitive materials that make the sensitivities of the respective colors become higher in the order of R color, G color and B color are used, a group of light-emitting elements is divided into an R area in which light-emitting elements of R color having the lowest sensitivity are arranged and a GB area in which light-emitting elements of G color and B color are arranged, and a passive-matrix driving process is simultaneously carried out on each of the areas in an independent manner. With this arrangement, the peak light-emitting intensity of the light-emitting elements of R color will reduce. Consequently the reliability of the exposure device will improve.

Moreover, because of adopting not area gradation but exposure gradation for controlling the dose of exposure, the number of color developments and expressions will increase without impairing the spatial resolution.

Here, in this example, the organic EL array is divided into R area in which light-emitting elements of R color are arranged and GB area in which light-emitting elements of G color and B color are arranged. Another arrangement, which has an RG area in which light-emitting elements of R color and one portion of light-emitting elements of G color are arranged and a GB area in which the rest of the portions of the light-emitting elements of G color and light-emitting elements of B color are arranged, may be adopted. For example, a group of light-emitting elements may be divided into an area in which 64 rows of elements of R color and 16 rows of elements of G color are arranged and another area in which the rest of 16 rows of elements of G color and 32 rows of elements of B color are arranged.

Figure 13:
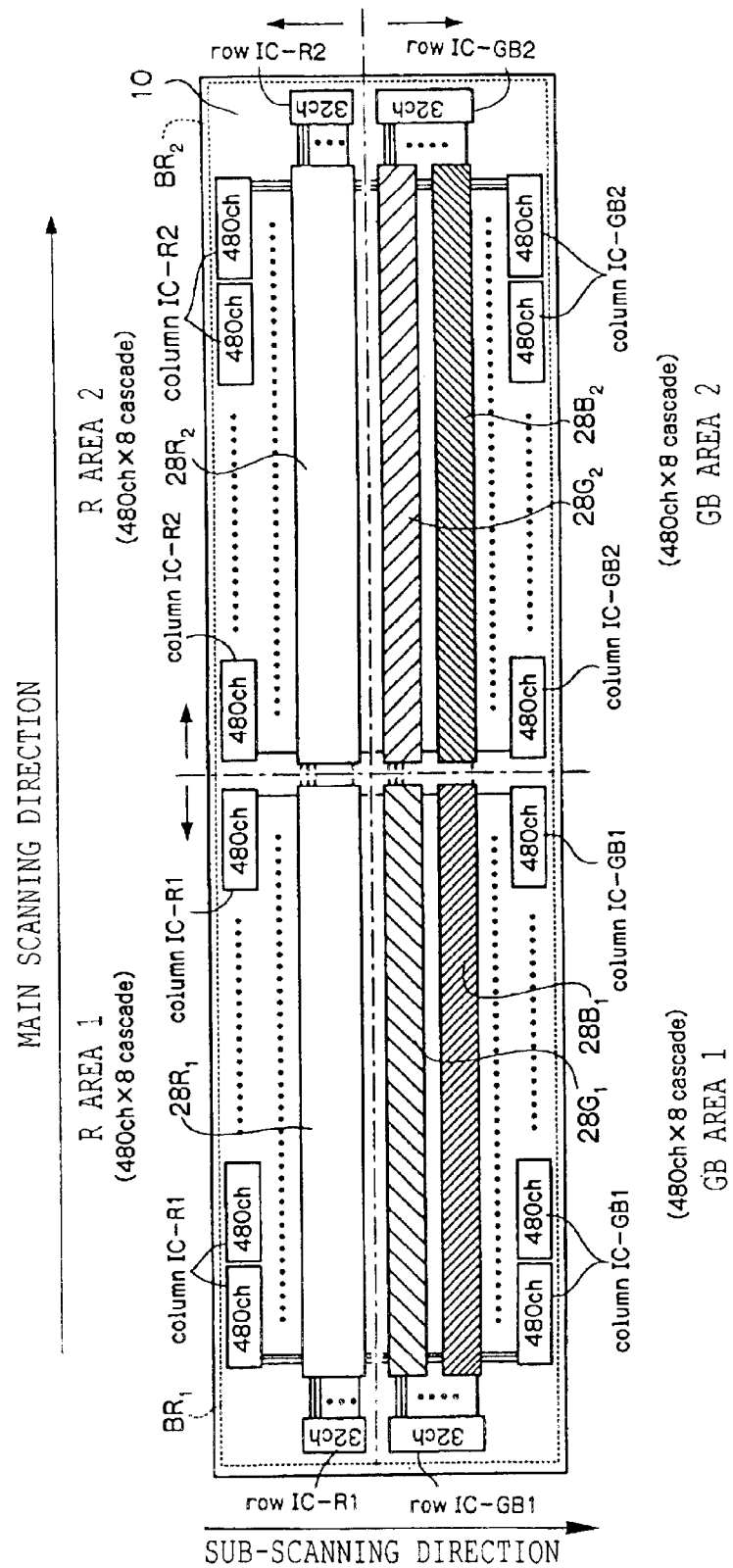
FIG. 13 is a plan view that shows a modified example of an exposure device according to a third embodiment.

Moreover, in order to achieve an exposure device capable of large-size exposing processes, a plurality of the above-mentioned exposure blocks, each having R area and GB area, may be formed on the same substrate. For example, as shown in FIG. 13, two exposure blocks $BR_1$ and $BR_2$ are arranged on a substrate 10 in the main scanning direction so that the respective blocks are aligned face to face with each other.

In other words, the exposure block $BR_1$ is provided with an R area $28R_1$ (R area 1) and a GB area 1 having combined G area $28G_1$ and B area $28B_1$, and a cathode-use driving circuit row IC-R1 and an anode-use driving circuit column IC-R1 that drive a simple matrix of R area 1 and an cathode-use driving circuit row IC-GB1 and an anode-use driving circuit column IC-GB1 that drive a simple matrix of GB area 1 are provided in a manner so as to surround the respective areas bearing the light-emitting elements.

Moreover, in the same manner, the exposure block $BR_2$ is provided with an R area $28R_2$ (R area 2) and a GB area 2 having combined G area $28G_2$ and B area $28B_2$, and a cathode-use driving circuit row IC-R2 and an anode-use driving circuit column IC-R2 that drive a simple matrix of R area 2 and an cathode-use driving circuit row IC-GB2 and an anode-use driving circuit column IC-GB2 that drive a simple matrix of GB area 2 are provided in a manner so as to surround the respective areas bearing the light-emitting elements.

For example, when element rows R and element rows R', each having 1920 light-emitting elements aligned in the main scanning direction, are alternately arranged in each of R areas 1 and 2, 3840 anode lines are required for each of the R areas 1 and 2. When two exposure blocks $BR_1$ and $BR_2$ are joined, 7680 anode lines are required. In other words, a driving operation with 7680 channels in the main scanning direction is available. Here, with respect to the areas of R area 1, R area 2, GB area 1 and GB area 2, the anode lines and cathode lines are formed in an independent manner.

The following description will discuss modified examples of the exposure device according to the above-mentioned first to third embodiments.

The above-mentioned first embodiment has explained two methods for assigning exposure gradations to a plurality of light-emitting elements of the same color, and the second embodiment has shown two methods for assigning exposure gradations to elements with respect to each of the colors; however, these methods may be appropriately combined with each other so as to carry out the assigning process of exposure gradations.

The above-mentioned first to third embodiments have explained a case in which an organic EL array having a plurality of light-emitting points is used. The light-emitting elements are not intended to be limited by the EL elements. For example, an array light source in which other light-emitting elements such as inorganic EL elements, light-emitting diodes (LED) and laser diodes (LD) are arranged in a matrix format may be used to provide the same effects. The organic EL element enables forming a number of light-emitting elements on the same substrate through a method such as vapor deposition, and consequently to provide the light-emitting elements which is often used. In place of an array light source, a light source such as light-emitting elements and a space modifying element such as a shutter array which spatially modifies a light source such as light-emitting elements and light from the light source may be used in combination.

In the above-mentioned first through third embodiments, light-emitting elements of RGB three colors are arranged on the same substrate as an array. The light-emitting elements of RGB three colors may be respectively arranged as an array on substrates that are different depending on the colors. Then, three units, constituted by an R-element array unit having light-emitting elements of R color, a G-element array unit having light-emitting elements of G color and a B-element array unit having light-emitting elements of B color, may be arranged to be used as an array. Moreover, two units, constituted by an R-element array unit having light-emitting elements of R color and a GB element array unit having light-emitting elements of G and B colors, may be arranged to be used as an array.

The above-mentioned first to third embodiments have exemplified a case in which light rays of RGB three colors are used to expose a photosensitive material. The invention is not intended to be limited by an exposure device that carries out exposing processes by using light rays of RGB three colors. For example, the invention may be applied to an exposure device which exposes a photosensitive material by using infrared rays or ultraviolet rays. Further, the kinds of the light emission colors and light-emission spectra are not limited to three kinds.

The above-mentioned first to third embodiments show that the number of exposure gradations and color developments and expressions will increase. Even when the gradation area that can be expressed is wide, it is not necessary to use all the range of the gradation area, and the exposure device may be operated within the gradation area. For instance, in the example shown in FIG. 7, controls of exposing dose with 1021 gradations in R color, those with 1534 gradations in B color and those with 1023 gradations in B color are available. Quantities (light-emitting intensity x exposing time) of light emission of the respective light-emitting elements may be properly set so that only the portion corresponding to 1021 gradations may be used for each of RGB colors to form a full-color image.

In the above-mentioned third embodiment, in R area, 32 sets of element rows R, R' including 64 rows are arranged, and in GB area, 16 sets of element rows G, G' including 32 rows are arranged and 16 sets of element rows B, B' including 32 rows are arranged. The sensitivities of the silver halide photosensitive material to light of respective RGB colors are represented by a ratio of 1 (R color) :10(G color) :70(B color). By arranging 7 sets of element rows R, R' including 140 rows in R area and 7 sets of element rows G, G' including 14 rows as well as 1 set of element rows B, B' including 2 rows in GB area, the light-emitting intensities will be substantially flat of respective RGB colors on a time-average basis. Consequently higher reliability of the exposure device can be achieved. The same effects can be obtained by arranging 140 sets of element rows R, R' including 280 rows in R area and 14 sets of element rows G, G' including 28 rows as well as 2 set of element rows B, B' including 4 rows in GB area.

Furthermore, even by setting the light-emitting intensities of respective RGB colors to substantially even values on a time-average basis, reliability tends to differ due to differences in the organic EL materials respectively forming the R elements, G elements and B elements. In most cases, under the same conditions in light-emitting intensity, reliability becomes higher in the order of R elements, B elements and G elements (less susceptible to reduction in light-emitting intensity due to degradation upon driving). Therefore, by setting the numbers of rows of the respective RGB colors so as to make the light-emitting intensity become higher in the order of R elements, B elements and G elements from the beginning, the ratios will be substantially flat at which the light-emitting intensity is lowered upon driving. Consequently the higher reliability of the exposure device can be achived. For example, by arranging 280 sets of element rows R, R' including 560 rows in R area and 14 sets of element rows G, G' including 28 rows as well as 3 sets of element rows B, B' including 6 rows in GB area, the light-emitting intensities can be higher in the order of R elements, B elements and G elements. Consequently the ratios can be substantially flat at which the light-emitting intensity is lowered upon driving. Thus, the reliability of the exposure device can be achieved.

Additionally, in order to faithfully reproduce a great number of exposure gradations achieved by the invention in a photosensitive material, a photosensitive material is often chosen to use in high exposure gradation. In particular, silver halide color photosensitive materials having superior gradation expressing property and gradation reproducibility are often used as the photosensitive material in the invention.

The exposure device of the invention can increase significantly the number of exposure gradations exceeding the conventional limit. According to the invention, the light-emitting intensity will reduce of light-emitting elements formed by a photosensitive material having the lowest sensitivity on a time-average basis. Consequently, the reliability of the exposure device will improve.

What is claimed is:

1. An exposure device comprising:
  a light-emitting element array in which a plurality of element rows, each of which includes a plurality of light-emitting elements that are controlled in exposure gradation in m (m≧3) stages with substantially the same light-emitting spectrum in an independent manner respectively, and are aligned in a main scanning direction that intersects the sub-scanning direction, are aligned in the sub-scanning direction for aligning at least n (n≧2) number of light-emitting elements in the sub-scanning direction; and
  a control device which assigns exposure gradations to each of the n number of light-emitting elements aligned in the sub-scanning direction according to the respective gradations obtained when a range from shadow to highlight is represented by {n×(m−1)+1} stages, and based upon the exposure gradations thus assigned, controls each of the n-number of light-emitting elements for exposing a single position of a photosensitive material n times at maximum.

2. An exposure device according to claim 1, wherein the light-emitting element is an organic EL element.

3. An exposure device according to claim 1, wherein the substrate on which the light-emitting array is formed is a TFT substrate.

4. An exposure device according to claim 1, wherein the photosensitive material is a silver halide photosensitive material.

5. An exposure device according to claim 4, wherein the light-emitting element controls exposure gradations by modulating at least either of a light-emitting intensity and exposing time.

6. An exposure device comprising:
  a light-emitting element array having p (p≧2) kinds of light-emitting elements with different light-emission spectra, in which a plurality of element rows, each of which has a plurality of light-emitting elements that are controlled in the exposure gradation in $m_i$ ($m_i \geq 3$, i is an integer of 1 to p) stages in an independent manner respectively for each of the kinds, and are aligned in the main scanning direction that intersects the sub-scanning direction, are aligned in the sub-scanning direction for aligning at least $n_i$ ($n_i \geq 2$, i is an integer of 1 to p) number of light-emitting elements in the sub-scanning direction for each of the kinds; and a control device which assigns exposure gradations to each of the ni number of light-emitting elements aligned in the sub-scanning direction according to the respective gradations obtained when a range from shadow to highlight is represented by $\{n_i \times (m_i-1)+1\}$ stages, and based upon the exposure gradations thus assigned, controls each of the ni-number of light-emitting elements for exposing a single position of the photosensitive material $n_i$ times at maximum.

7. An exposure device according to claim 6, wherein the number of light-emitting elements that emit light of the light-emitting spectrum having the lowest sensitivity to the photosensitive material in the p kinds of light-emitting elements that are aligned in the sub-scanning direction is made greater than the number of the light-emitting elements of the other kinds for each of the kinds.

8. An exposure device according to claim 6, wherein the light-emitting elements of p kinds are prepared as three kinds of light-emitting elements having light-emitting spectra that are capable of forming a full color image in association with photosensitive materials.

9. An exposure device according to claim 6, wherein the number of exposure gradations for each kind is arranged to satisfy the following equation:

$$\{n_1 \times (m_1-1)+1\} = \{n_2 \times (m_2-1)+1\} = \ldots = \{n_p \times (m_p-1)+1\}.$$

10. An exposure device according to claim 6, wherein the light-emitting element is an organic EL element.

11. An exposure device according to claim 6, wherein the photosensitive material is a silver halide photosensitive material.

12. An exposure device according to claim 8, wherein the p kinds of light-emitting elements are formed as three kinds of red, green and blue light-emitting elements.

13. An exposure device according to claim 10, wherein the substrate on which the light-emitting array is formed is a TFT substrate.

14. An exposure device according to claim 11, wherein the light-emitting element controls exposure gradations by modulating at least either of a light-emitting intensity and exposing time.

15. An exposure device comprising:

a light-emitting element array which includes matrix electrodes that include a plurality of cathodes and a plurality of anodes arranged in a lattice shape, and are divided into a plurality of areas in the cathode aligning direction or the anode aligning direction and light-emitting elements that are provided at intersections of the matrix electrodes, the light-emitting element array being provided with p ($p \geq 2$) kinds of light-emitting elements with different light-emission spectra, in which a plurality of element rows, each of which has a plurality of light-emitting elements that are controlled in the exposure gradation in $m_i$ ($m_i \geq 3$, i is an integer of 1 to p) stages in an independent manner respectively for each of the kinds, and are aligned in the main scanning direction that intersects the sub-scanning direction, are aligned in the sub-scanning direction for aligning at least $n_i$ ($n_i \geq 2$, i is an integer of 1 to p) number of light-emitting elements in the sub-scanning direction for each of the kinds;

a control device which assigns exposure gradations to each of the n number of light-emitting elements aligned in the sub-scanning direction according to the respective gradations obtained when a range from shadow to highlight is represented by $\{n \times (m-1)+1\}$ stages, and based upon the exposure gradations thus assigned, controls each of the n-number of light-emitting elements for exposing a single position of the photosensitive material n times at maximum; and a driving device which, based upon a control signal from the control device, applies a voltage between the cathode and anode with respect to each of the divided areas, and independently drives the light-emitting elements that are provided at intersections of the matrix electrodes in the corresponding area for emitting light.

16. An exposure device according to claim 15, wherein the number of exposure gradations for each kind is arranged to satisfy the following equation:

$$\{n_1 \times (m_1-1)+1\} = \{n_2 \times (m_2-1)+1\} = \ldots = \{n_p \times (m_p-1)+1\}.$$

17. An exposure device according to claim 15, wherein the photosensitive material is a silver halide photosensitive material.

18. An exposure device according to claim 16, wherein the substrate on which the light-emitting array is formed is a TFT substrate.

19. An exposure device according to claim 17, wherein the light-emitting element controls exposure gradations by modulating at least either of a light-emitting intensity and exposing time.

20. An exposure device comprising:

a plurality of kinds of light-emitting elements that have different light-emitting spectra, with at least one light-emitting element with respect to each of the kinds being aligned in the sub-scanning direction, and having a light-emitting element array in which the plurality of kinds of light-emitting elements are arranged for making the number of light-emitting elements which emit the light of the light-emitting spectrum having the lowest sensitivity with respect to the photosensitive material in the plurality of kinds of light-emitting elements greater than the number of elements for each kind of the light-emitting element of other kinds in the sub-scanning direction, wherein by using the plurality of light-emitting elements arranged in the sub-scanning direction, a single position of the photosensitive material is exposed a plurality of times.

21. An exposure device according to claim 20, wherein the plurality of kinds of light-emitting elements are prepared as three kinds of red, green and blue light-emitting elements having light-emitting spectra that are capable of forming a full color image in association with photosensitive materials.

22. An exposure device according to claim 20, wherein the light-emitting element is an organic EL element.

23. An exposure device according to claim 2, wherein, when a silver halide photosensitive material is used as the photosensitive material, the number of red light-emitting elements is made greater than each of the number of blue light-emitting elements and the number of green light-emitting elements.

24. An exposure device comprising:

three kinds of red, green and blue light-emitting elements, with at least one light-emitting element with respect to each of the kinds being aligned in the sub-scanning direction, and having a light-emitting element array in which the three kinds of light-emitting elements are arranged for making the number of red light-emitting elements being made greater than each of the number of the blue light-emitting elements and the number of the green light-emitting elements in the sub-scanning direction, wherein by using the three kinds of red, green and blue light-emitting elements arranged in the sub-scanning direction, a single position of the photosensitive material is exposed a plurality of times.

25. An exposure device which exposes a photosensitive material comprising:

a light-emitting element array which includes matrix electrodes which include a plurality of cathodes and a plurality of anodes arranged in a lattice shape and are divided into a plurality of areas in the cathode aligning direction or the anode aligning direction, and the light-emitting element array which includes light-emitting elements that are provided at intersections of the matrix electrodes; and a driving device which applies a voltage between the cathode and anode with respect to each of the divided areas, and independently drives the light-emitting elements that are provided at intersections of the matrix electrodes in the corresponding area for emitting light.

26. An exposure device according to claim 25, wherein the light-emitting array comprises light-emitting elements of a plurality of kinds having respectively different light-emitting spectra.

27. An exposure device according to claim 25, wherein the light-emitting element is an organic EL element.

28. An exposure device according to claim 26, wherein the matrix electrodes are divided into an area in which light-emitting elements that emit light having light emission spectrum to which the photosensitive material has the lowest sensitivity are formed at the intersections among the plurality of kinds of light-emitting elements and areas other than the area.

29. An exposure device according to claim 26, wherein the light-emitting elements of a plurality of kinds are prepared as three kinds of red, green and blue light-emitting elements having light-emitting spectra that are capable of forming a full color image in association with photosensitive materials.

30. An exposure device, which exposes a silver halide photosensitive material, comprising:

a light-emitting element array which has matrix electrodes that include a plurality of cathodes and a plurality of anodes arranged in a lattice shape, and are divided into a plurality of areas in the cathode aligning direction or the anode aligning direction and three kinds of red, green and blue light-emitting elements that are provided at intersections of the matrix electrodes, with the red light-emitting elements having the lowest sensitivity to the photosensitive material being placed on the intersections in a predetermined divided area as well as the green and blue light-emitting elements being placed on the intersections within other divided areas; and a driving device which applies a voltage between the cathode and anode with respect to each of the divided areas, and independently drives the light-emitting elements that are provided at intersections of the matrix electrodes in the corresponding area for emitting light.

31. An exposure device according to claim 30, wherein the light-emitting element is an organic EL element.

* * * * *